United States Patent
Chao

(10) Patent No.: US 7,475,431 B2
(45) Date of Patent: Jan. 6, 2009

(54) USING SECURITY LEVELS TO IMPROVE PERMISSION CHECKING PERFORMANCE AND MANAGEABILITY

(75) Inventor: Ching-Yun Chao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/865,348

(22) Filed: Jun. 10, 2004

(65) Prior Publication Data

US 2006/0005019 A1 Jan. 5, 2006

(51) Int. Cl.
*G06F 9/44* (2006.01)
*G06F 17/30* (2006.01)

(52) U.S. Cl. .............................. 726/30; 713/166; 718/1
(58) Field of Classification Search .................... 726/30
See application file for complete search history.

(56) References Cited

U.S. PATENT DOCUMENTS

| | | | | |
|---|---|---|---|---|
| 4,177,510 | A | | 12/1979 | Appell et al. ............... 711/163 |
| 5,249,231 | A | * | 9/1993 | Covey et al. ................ 711/163 |
| 5,418,956 | A | | 5/1995 | Willman ..................... 711/206 |
| 5,469,556 | A | * | 11/1995 | Clifton ........................ 711/163 |
| 6,052,780 | A | * | 4/2000 | Glover ......................... 713/193 |
| 6,651,171 | B1 | * | 11/2003 | England et al. ............. 713/193 |
| 6,986,052 | B1 | * | 1/2006 | Mittal ........................ 713/190 |
| 7,103,783 | B1 | * | 9/2006 | Friedman et al. .............. 726/15 |
| 7,131,143 | B1 | * | 10/2006 | LaMacchia et al. ........... 726/30 |
| 7,203,833 | B1 | * | 4/2007 | Abadi et al. ................ 713/167 |
| 7,260,717 | B2 | * | 8/2007 | Liu ............................. 713/166 |
| 7,272,832 | B2 | * | 9/2007 | Gardner ....................... 718/105 |
| 2003/0037237 | A1 | * | 2/2003 | Abgrall et al. .............. 713/166 |
| 2003/0051169 | A1 | | 3/2003 | Sprigg et al. ................ 713/201 |
| 2004/0093505 | A1 | * | 5/2004 | Hatakeyama et al. ....... 713/189 |
| 2006/0015749 | A1 | * | 1/2006 | Mittal ........................ 713/190 |

OTHER PUBLICATIONS

Erlingsson et al., "IRM Enforcement of Java Stack Implementation," Feb. 2000.*
Office action, made final, for co-pending U.S. Appl. No. 10/865,345, mailed Jul. 21, 2008, 10 pages.

* cited by examiner

*Primary Examiner*—Matthew Heneghan
(74) *Attorney, Agent, or Firm*—VanLeeuwen & VanLeeuwen; Herman Rodriguez

(57) ABSTRACT

Complexity is reduced and performance is improved when enforcing security restrictions on the execution of program code in a runtime environment. Units of executable code, such as methods or functions, are classified by "security level." Code units belonging to a "trusted" security level may call any other code unit in the runtime environment, but other security levels are restricted in the code units they can call. Code units may also have "instance permissions" to allow them to have permission to call other individually-specified code units that they would normally be precluded from calling, due to their security level. The security level scheme described herein reduces the complexity of establishing permissions with respect to different code units in the runtime environment. This security level scheme also improves runtime performance by making it unnecessary to check individually-defined permissions in many cases.

12 Claims, 14 Drawing Sheets

USING SECURITY LEVELS TO IMPROVE PERMISSION CHECKING PERFORMANCE AND MANAGEABILITY

CROSS REFERENCE TO RELATED APPLICATIONS

This application is related to commonly assigned, co-pending U.S. application Ser. No. 10/865,345, filed on the same date and entitled "System and Method for Using Security Levels to Simplify Security Policy Management," which is incorporated herein by reference.

BACKGROUND OF THE INVENTION

1. Technical Field

The present invention relates generally to a system and method for defining and enforcing security restrictions with respect to portions of executable program code in a runtime environment. In particular, the present invention reduces the computational and administrative complexity associated with such security restrictions.

2. Description of the Related Art

JAVA™ (a trademark of Sun Microsystems, Inc.) is an object-oriented, compiled, multi-threaded computer language that generates platform-independent executable files.

JAVA™ is object-oriented. This means, in the simplest terms, that it allows for the association of member functions or "methods" within data structures. Indeed, all JAVA™ programs are made up solely of data structure types known as "classes," where classes contain both data fields and methods.

Classes may "inherit" characteristics of other classes. When a "descendant" class inherits from another "ancestral" class (also referred to as a "base" class), it inherits all of the data fields and methods of the ancestral class. In addition, a descendent class may provide its own methods to supplement or take the place of ancestral class methods.

JAVA™ is compiled. That means that before a JAVA™ program (written as source code) can be executed, it must be processed by a compiler to make an executable form of the program. Executable JAVA™ programs are stored in ".class" files, with each ".class" file containing executable object code for a single JAVA™ class.

JAVA™ is multi-threaded. This means that a single JAVA™ program can have several sequences of code executing concurrently. Each of these sequences is known as a thread. Multi-threaded program languages, such as JAVA™, are very useful when writing software such as, for instance, communication software, where it is helpful to allow the software to perform other tasks while waiting for input.

JAVA™ produces platform-independent executables. When a JAVA™ program is compiled to produce ".class" files, those ".class" files are capable of being executed on any platform having a JAVA™ runtime environment. A JAVA™ runtime environment is a piece of software that allows a computer to executes JAVA™ ".class" files. JAVA™ runtime environments are available for many, if not most, commonly used computer platforms today.

There are essentially two kinds of JAVA™ runtime environments: interpreters and just-in-time compilers. Interpreters directly interpret the binary code contained in ".class" files and execute instructions corresponding to that binary code as the interpretation process is carried out. Just-in-time compilers, on the other hand, first translate the binary code into native instructions, then execute the native instructions. Native instructions are instructions that are designed to be executed directly by the computer's hardware.

JAVA™'s platform independence makes it particularly suitable for applications requiring portable program code. One of the prominent uses of JAVA™ is for writing applets. Applets are (generally small) programs that are intended to be embedded in web pages. Most modern web browsers support JAVA™ applets by providing a JAVA™ virtual machine (JVM) within the web browser. A special applet tag within the webpage source file tells the web browser to load and execute one or more ".class" files. The code contained within these ".class" files may also make use of standard JAVA™ library classes for performing standard operations, such as input/output, sorting, searching, and the like.

Executing portable code, especially in a web browser, raises a number of security concerns. Because JAVA™ is a general-purpose programming language with a complete set of input/output library classes and methods, a rogue applet having access to those library functions has the potential to cause a significant amount of damage to a computer system. An unsuspecting user could download such an applet by simply accessing a web page containing the applet, without even being aware of the existence of the applet, much less the damaging code contained within the applet.

The designers of the JAVA™ programming language were aware of this concern. When version 1.0 of the JAVA™ Developer's Kit (JDK) was released, severe restrictions were placed upon an applet's ability to perform input/output operations on the client machine. For example, early JAVA™ applets were unable to read or write files on the client machine. The limited execution environment that this early JAVA™ security model provided is typically referred to as "the sandbox."

Later versions of JAVA™, starting with JAVA™ version 1.2 (also referred to as simply "Java 2"), employ a more sophisticated security model to allow enhanced functionality on the client side without compromising security. Under the JAVA™ 2 security model, "trusted" code can be given permission to perform certain sensitive operations, such as reading or writing files. Class files containing trusted code are authenticated using a digital signature scheme. In the JAVA™ 2 security object model, objects of class "CodeSource" are used to identify the source (by Uniform Resource Locator or "URL") of a given JAVA™ class file and the cryptography keys (if any) that were used to sign that class file.

In JAVA™ 2 and subsequent releases of the JAVA™ programming language, the responsibility of enforcing which portions of code have certain permissions is assumed by an object instantiating the "SecurityManager" class. The SecurityManager works in conjunction with another object, an instantiation of the "AccessController" class, to determine whether a particular object or method has permission to access another object's data or invoke its methods.

Under the JAVA™ 2 security object model, a class of objects called "Permission" is used to establish rules regarding the permissions granted to particular methods or objects. Particular kinds of permissions are defined as subclasses of the base "Permission" class. Each of these subclasses has three properties: a type, a target name, and one or more optional actions. The "type" of the Permission is simply the name of the subclass of "Permission." For example, "java.io.FilePermission" is the name given to one of the subclasses of "permission" that is defined in the standard JAVA™ library. The target name identifies a kind of resource or instance(s) of a resource to which the permission pertains. For example, in the case of a "java.io.FilePermission," where the permission pertains to the ability to access a particular file, the target name would be the name of the file. Many other target names (such as "showWindowWithoutWarningBanner," for example) are defined by the JAVA™ API specification. Programmers may choose to introduce their own target names for particular resources, as well. The optional "actions" associated with a "Permission" object denote particular operations permitted with respect to the resource identified by the target name. For example, an instance of java.io.FilePermission may be associated with a set of actions such as read, write, or delete, which may be performed with respect to the file identified by the target name.

A class called "policy" is used to define the security policy for the AccessController to follow. Typically, this is done by reading a "policy file" from disk, where the policy file defines the permissions associated with each code source. Specifically, the policy file defines what are referred to as protection domains, which are represented within the JAVA™ language as objects of class "ProtectionDomain." A ProtectionDomain is a mapping from a CodeSource to a collection of Permissions. Each class in the JAVA™ virtual machine may belong to one and only one ProtectionDomain, which is set when the class is first defined.

Permissions are enforced by placing a call to the "checkpermission( )" method of the AccessController class in either the constructor or some other method of that class representing the protected resource. For example, a method that deletes a file may precede the actual file deletion code with a call to the "checkpermission( )" method of the AccessController class in order to determine whether the calling method has permission to delete that file.

The checkpermission( ) method verifies that the calling method has permission to delete the file by traversing the JAVA™ virtual machine's call stack to determine the protection domain of each calling method on the call stack. If each protection domain represented on the call stack contains the correct permission, checkpermission( ) terminates normally, and execution continues. If, on the other hand, one of the calling methods on the call stack has a protection domain that does not contain the requisite permission, an "AccessControlException" is thrown so as to indicate to the method seeking permission that that method does not have permission to perform the particular action.

Traversing the security policy data for each caller in the call stack to determine its protection domain is computationally intensive. Program call stacks can become exceedingly long, and the computation burden this imposes is multiplied by the number of permissions defined in each protection domain. This computational complexity can lead to degraded system performance.

Another challenge to providing a secure platform is experienced when installing new class files. When a new class file is installed, policy information needs to be updated to grant required permissions to this new class file. A new class file or program to be installed may come bundled with a policy file listing all the required permissions. A system administrator can make policy configurations and grant permissions to the new application accordingly. However, each permission requested by a new application must be examined carefully by a system administrator for compliance with organizational policy and security guidelines so that applications will not be granted permissions that may be exploited to compromise system integrity. This review process requires a detailed understanding of the operation environment and is subject to risk of human error.

What is needed, therefore, is a system and method for decreasing the complexity of defining and enforcing security restrictions on portions of executable program code in a runtime environment.

SUMMARY

The present invention provides a system and method for improved security policy management. According to a preferred embodiment, a system administrator or security program is provided an ability to group items of program code (such as objects or methods) into various security levels that correspond to the general function performed by the respective programs.

In one embodiment, security levels include "trusted," "provider," "privileged," and "standard" security levels. The "trusted" security level is generally used for low-level code that provides basic functionality to a software platform or execution environment. Trusted programs are granted permission to access any system resources.

The "provider" security level is used for service provider applications that plug into the software platform. Service provider code is granted permission to access selected system resources. Service provider code, in general, cannot access trusted code, except that service provider code may access particular methods defined in a Service-provider Programming Interface (SPI). The service provider programming interfaces exposes selected methods in trusted code in order for service provider code to obtain services from the trusted code. On the other hand, trusted code is granted permission to access service provider code.

"Privileged" code is used for security-aware application code. Privileged code can access a restricted set of system resources. Privileged code cannot access trusted code and service provider code, except that privileged code can access those methods that are defined in an Application Programming Interface (API).

The "standard" security level is used for top-level code and other less-trusted software. Standard code can access other standard code but cannot access higher-security-level code (e.g., trusted, provider, and privileged code) unless a permission is granted that permits the standard program authorization to access the higher security level code. A system administrator or security software, assigns security levels according to the type of software and stores the assigned security level in a security policy that corresponds to each item of code or code source.

In one embodiment, programming interfaces are provided between different security levels to allow secure access to essential system resources controlled by security-protected code. Service-provider Programming Interfaces (SPIs) are provided to allow service provider code access to trusted code, and Application Programming Interfaces (APIs) are provided to allow privileged code access to trusted and service provider code.

A system administrator or a security program may grant permissions to allow installed application code the ability to access higher-security-level code. A permission is defined by a target name and by an optional action. The target name typically identifies the resource, and the action is used to indicate the operation to be performed on that resource. Permissions can be categorized into two types depending on whether the target name refers to specific instances of the resource. The first type of permission, referred to as a "static permission," refers to a type of resource, but not to any specific resource instance. A caller either has or does not have the permission. Some examples of static permissions include the "ExitVM" and "SetSecurityManager" permissions in the Java2 Security model. The second type of permission, referred to as an "instance permission" or a "dynamic permission," refers to a specific instance of a resource, by way of the permission's target name. For example, the Java2 permission type "FilePermission" is an instance permission. The target name of a FilePermission can refer to a single file or to a set of files. A preferred embodiment of the present invention provides a technique for optimizing and managing static permissions.

Code at each security level is granted a set of static permissions corresponding to that level. The static permissions are granted such that code at a higher security level has been granted all of the permissions granted to code at lower security levels. When a method (or function, procedure, subroutine, etc.) calls a protected method, a "check permission" routine is called to ensure that every caller in the call stack (including the program making the call) has authorization to access the requested method. If the required permission is a static permission and that required permission has been associated with a security level, the required permission is mapped to the minimum security level associated with that permission. The "check permission" routine checks the security level of each caller by reading policy data that corresponds to that caller. The policy data is stored in a secure nonvolatile storage area so that policy data cannot be changed without sufficient authorization. The security levels of the callers in the call stack are each compared with the security level of the currently called method. If a caller in the call stack does not have a security level higher than or the same as the security level of the currently called method, then the "check permission" routine will fail and the caller will not be allowed to access the method.

If, on the other hand, the calling method requires an instance permission, each caller on the stack must have been granted an instance permission that at least implies the required instance permission. In one embodiment, an instance permission may be treated as a static permission that pertains to a specific resource or set of resources. In this particular embodiment, a dynamic permission may be included in a system's security policy and compared to the required permission for the method that is being called. An instance permission in that case is effectively converted into a static permission.

By first checking the security level of a caller or called method, it is possible to avoid performing an exhaustive check of individual permissions. If a caller or called method is of the proper security level to allow execution to proceed, there is no need to check individual permissions. If the caller/callee fail the preliminary security level check and the required permission is an instance permission, then the individual permissions of the caller or callee are checked. This scheme allows for enhanced performance (by avoiding exhaustive permission checks in many cases) while still retaining the flexibility associated with allowing individual permissions to be established. This scheme also provides a simplified way to manage the security policy of application code. Instead of granting individual permissions to applications, an application can be assigned a proper security level in order to be granted the permissions in the set of permissions corresponding to that security level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1A:
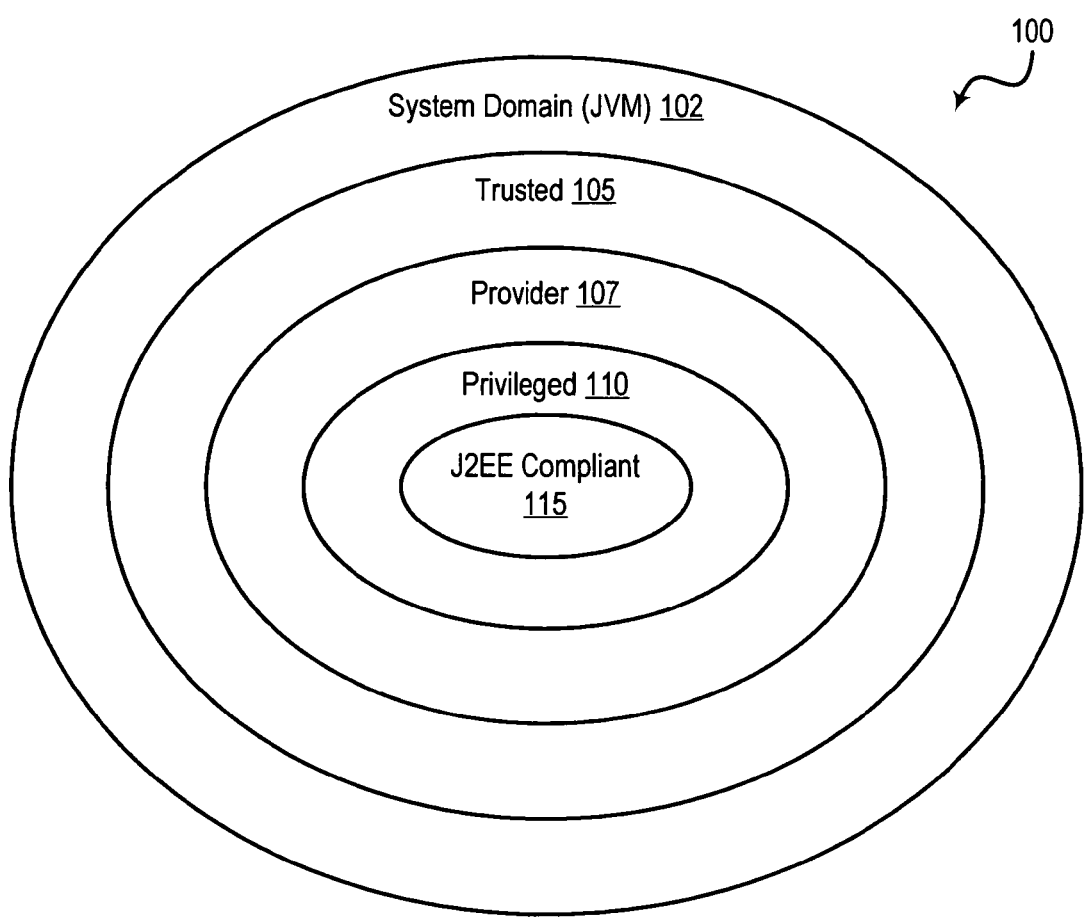
FIG. 1A is a category diagram showing various categories used by a software platform's security manager in a preferred embodiment of the present invention.

The following is intended to provide a detailed description of an example of the invention and should not be taken to be limiting of the invention itself. Rather, any number of variations may fall within the scope of the invention, which is defined in the claims following the description.

A preferred embodiment of the present invention is implemented in the context of the JAVA™ 2 Security architecture. Since JAVA™ is an object-oriented programming language in which all executable routines take the form of "methods" that are associated with "classes" of objects, the term "method" is used frequently throughout this document to refer to executable routines or subroutines in a program. It should be understood by those skilled in the art, however, that the term "method," as it is used in this document, should be interpreted broadly so as to encompass any executable routine of program code in any programming language, as the teachings of the present invention are applicable in a wide variety of contexts and with respect to a wide variety of programming languages. Other commonly-used terms-of-art that are encompassed by the term "method," as used herein, include (but are not limited to): procedure, subroutine, function, member function, constructor, destructor, object, operator and clause (as in the logic programming language Prolog). Another generic term that is used in this document is "code unit." The term "code unit," as used in this document, refers to a portion of program code. One of ordinary skill in the art will recognize that the term "code unit" encompasses the concept of "method," as the term is used herein, as well.

Another term that is, for the most part, used interchangeably with the term "method" throughout this document is the term "process." One of ordinary skill in the art will note that this is a departure from the usual meaning of the term "process," as it is used in relation to operating systems, where the term is used to describe a stream of execution (like a thread). Unless otherwise noted in this document by a qualifying remark (such as "in the operating system sense"), the term "process" should be construed as being interchangeable with "method" for the purposes of this document.

A preferred embodiment of the present invention is used to enhance the runtime code security features provided by the JAVA™ programming language and runtime environment. The JAVA™ runtime environment, generally comprising a JAVA™ Virtual Machine (JVM) and associated libraries and class files is a type of user-level runtime environment. For the purposes of this document, a user-level runtime environment is defined as a grouping of code components that execute on top of an operating system platform (i.e., as a user-level process [in the operating system sense] or user-level thread) and that must be present at runtime in order to execute an application. A user-level runtime environment may include application code, library code, middleware, interpreters, emulators, or virtual/abstract machines (such as a JVM or the Warren Abstract Machine), but does not include the operating system kernel.

In a preferred embodiment, the standard JAVA™ security classes, (i.e., "SecurityManager," "AccessManager," "ProtectionDomain," etc.) are extended (i.e., are used to create a descendant class) to include support for security levels and performance-enhanced enforcement of security restrictions. In particular, a preferred embodiment of the present invention overloads (i.e., overrides) the CheckPermission( ) method of the "AccessManager" class to employ a performance-enhancing algorithm that uses the security levels of code units to determine the security restrictions (if any) placed on those code units. The structure and operation of this preferred embodiment, as well as a number of alternative forms to the invention, will become apparent upon a reading of the below description and accompanying figures.

Turning now to the figures, FIG. 1A is a category diagram showing various categories of security levels used by a software platform's SecurityManager in accordance with a preferred embodiment of the present invention. Security levels 100 (which may also be referred to as "privilege levels") may be divided into any number of security levels. FIG. 1A shows four security levels: a set of trusted code units 105, a set of service provider code units 107, a set of privileged code units 110, and a set of J2EE-compliant code units 115, the code units residing within System Domain (JVM) 102. Using the three security levels shown in FIG. 1A, the set of trusted code units includes the code units that comprise the software platform itself and components directly included in the software platform, such as the SecurityManager. Trusted code units are able to call any other code unit from any set.

The second security level is the set of provider code units 107. These are code units that are provided by a known component provider. Provider code units 107 are more closely coupled to the software platform and have access to Service-provider Programming interfaces (SPIs) that are generally not provided to standard top-level code units. SPIs are interfaces that allow service provider code to access trusted code units or to become integrated with the trusted code units that comprise the foundation of the software platform. The third security level is the set of privileged code units 110. Privileged code units 110 represent security aware application code. Privileged code units 110 are allowed to access Application Programming Interfaces (APIs) to perform application-level security functions.

The last security level shown in FIG. 1A is a set of standard J2EE-compliant code units 115 (with "J2EE" standing for Java 2 Enterprise Edition). An example of a standard code unit is a top-level application. Standard code units are granted the standard set of permissions that are defined by the J2EE Specification.

Figure 1B:
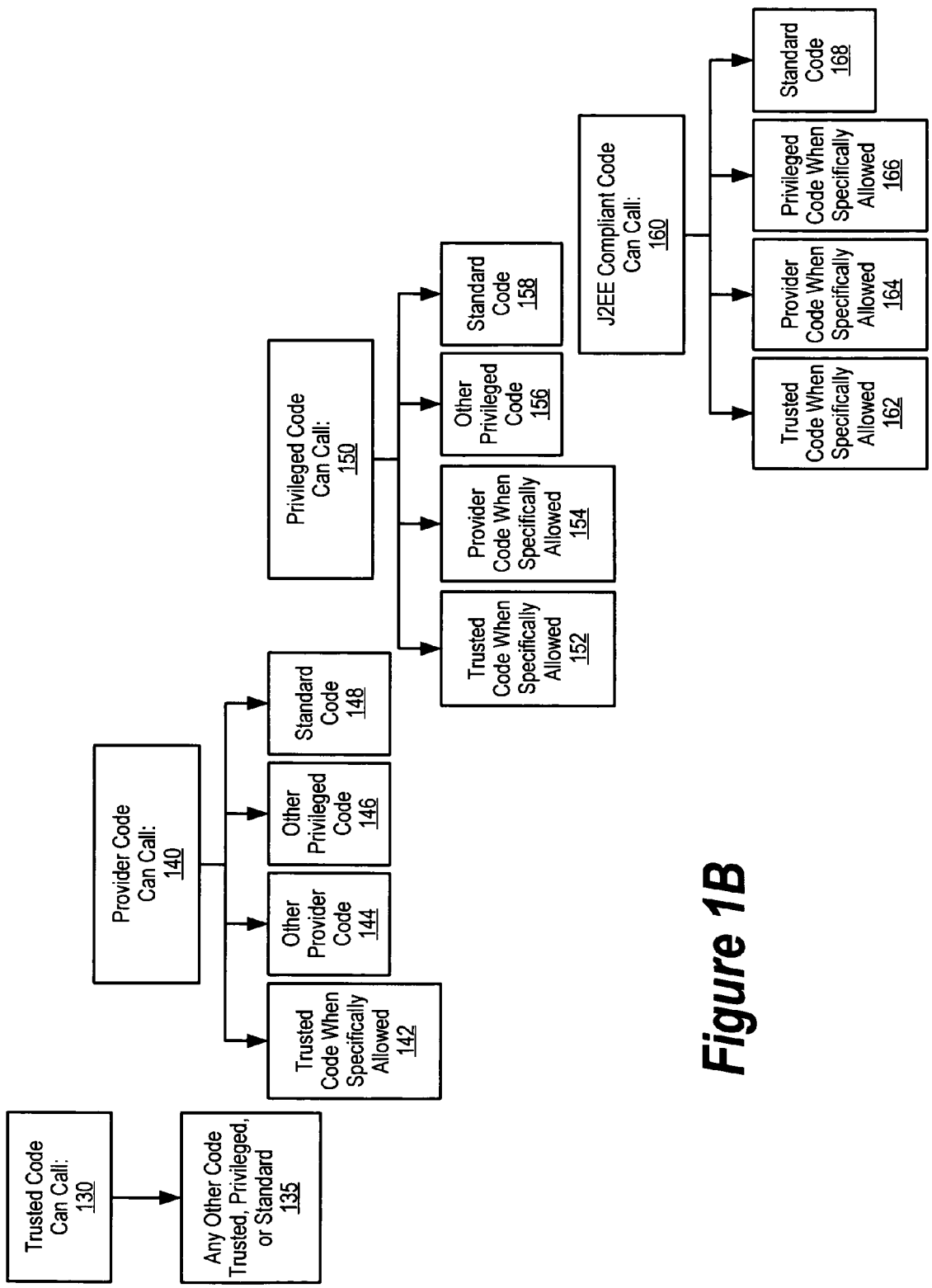
FIG. 1B is a hierarchical diagram showing various categories used by a software platform's security manager in a preferred embodiment of the present invention.

FIG. 1B provides a hierarchy diagram showing the general permissions provided to each set of code units. Trusted code units 130 are able to call any other code unit 135 (i.e., another trusted code unit, a provider code unit, a privileged code unit, or a standard code unit). The fact that a trusted code unit's ability to call any other type of code unit can be determined based solely upon its security level means that individual Permission objects do not need to be examined when a calling code unit is known to be trusted. This reduces the overall computational overhead associated with runtime security checking.

Provider code units 140 can only call trusted code units 142 when specifically allowed in the trusted code unit's required permissions. One example of a provider code unit's calling a trusted code unit is when a provider code unit invokes a Service-provider Programming Interface (SPI) that has instance permissions to set or retrieve data. Provider code units 140 can call other provider code units 144 as well as privileged 146 and standard code units 148 as these code units have the same security level (in the case of other provider code units) or a lower security level (in the case of privileged and standard code units).

Privileged code units 150 can call trusted 152 and provider 154 code units only when specifically allowed (e.g., through an Application Programming Interface). Privileged code units 150 may, as a matter of course, call other privileged code units 156, as well as standard code units 158.

Standard code units 160 can only call trusted code units 162 when specifically allowed via the trusted code unit's required permissions and can call provider code units 164 when specifically granted the provider code unit's required permissions. Likewise, standard code units 160 can call privileged code units 166 only when specifically granted the requisite permission. Standard code units 160, however, can also call other standard code units 168 without restriction.

After examining the various security levels shown in FIGS. 1A and 1B, it will be readily understood by those skilled in the art that additional security levels can be added to further define security permissions. For example, standard code units can be divided into administrator code units and end-user code units with the administrator code units being allowed to call end-user code units, but the end-user code units being restricted as to which administrator code units can be invoked.

Figure 2:
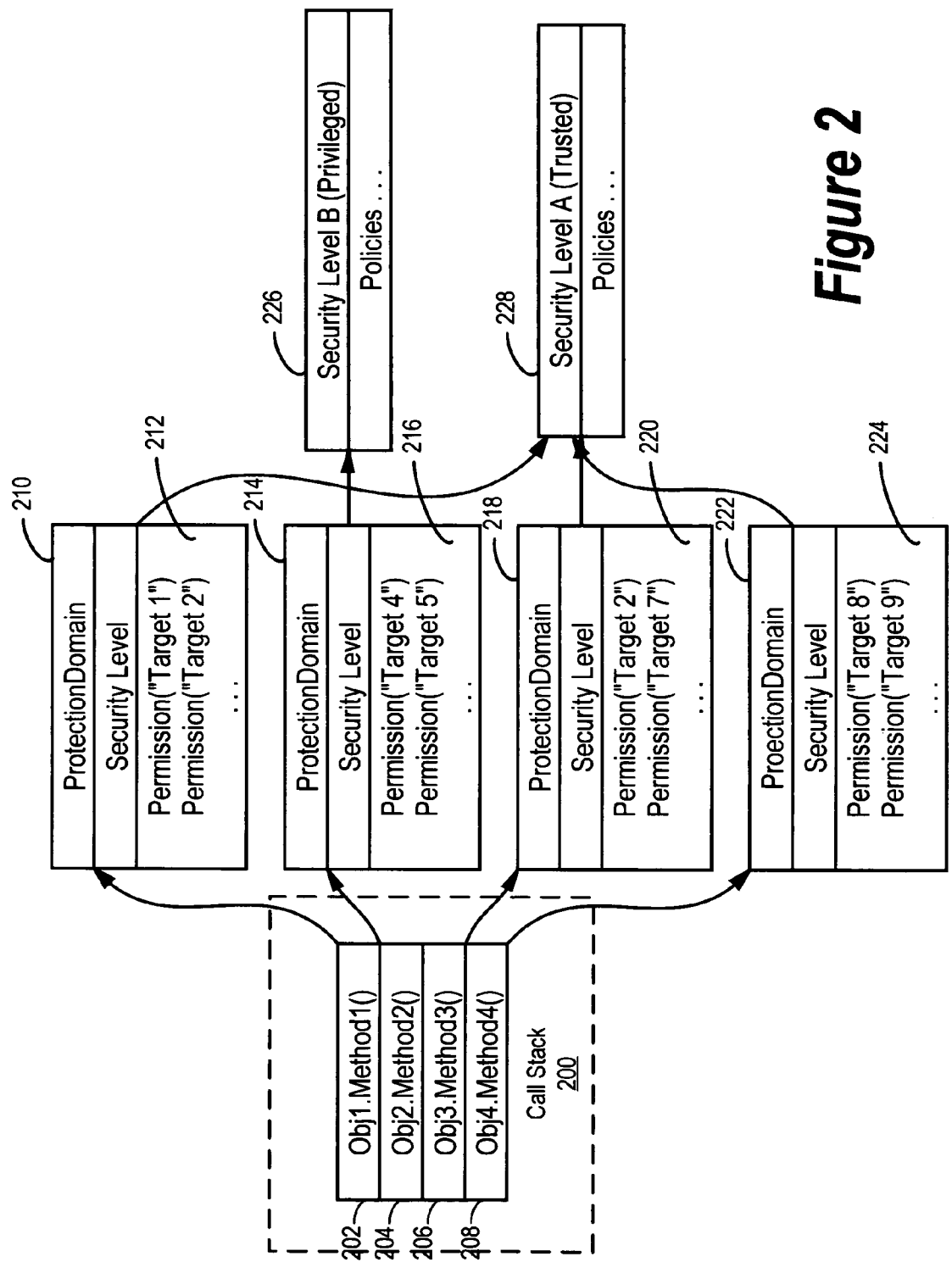
FIG. 2 is a diagram depicting the representation of a security levels and policies associated with callers on a call stack in accordance with a preferred embodiment of the present invention.

FIG. 2 is a diagram depicting the representation of a security levels and policies associated with callers on a call stack in accordance with a preferred embodiment of the present invention. Call stack 200 is a last-in-first-out (LIFO) data structure containing information regarding a sequence of nested calls to code units in the runtime environment. In the JAVA™-based implementation of a preferred embodiment, these code units are typically methods, although other forms of code units are possible, particularly in programming languages other than JAVA™.

The runtime implementations of most programming languages utilize some form of call stack to contain information about the sequence of calls taken at runtime. The individual data elements making up the call stack are referred to as "stack frames," in conventional computing parlance (e.g., stack frames 202, 204, 206, and 208 in FIG. 2). At a minimum, a stack frame will generally contain an address or other information to allow control to be returned to a calling code unit once execution of the current code unit has completed. In typical implementations of Algol-derived languages that support recursion, such as C, C++, or JAVA™, the call stack will contain additional information, such as the values of automatic variables.

One of ordinary skill in the art will recognize, however, that the precise form that a call stack takes in a given runtime environment may differ, depending on the programming language, runtime environment design, and processor hardware employed. For example, while it is typical for a single LIFO structure to be used in the runtime environment of a program in the C language, some languages and runtime environments make use multiple LIFO structures to contain the same information (such as the Prolog programming language, which typically employs multiple stacks to contain call information). Some forms of code optimizations may also complicate the structure of a call stack. For example, on certain RISC (Reduced Instruction Set Computer) processors, it is customary to use a register in the processor to contain a return address; in such instances, the "stack frame" for the currently-executing code unit may actually be contained within the registers of the processor, rather than in memory. In other situations, an optimizing compiler or linker may "inline" a given code unit into its calling code unit, in which case no physical stack frame may be generated for the inlined call.

Since the information contained within a call stack may take so many different forms, the term "call stack" is used broadly in this document to refer to any form of data (whether existing as a single structure in memory, as multiple structures in memory, as register contents in a processor, or any combination thereof) from which the current sequence of nested calls to code units leading up to the current point of execution in the runtime environment can be discerned. Returning now to FIG. 2, it can be seen that in the typical case of a JAVA™-based preferred embodiment of the present invention, stack frames 202, 204, 206, and 208 map into a sequence of nested method calls in a JAVA™ virtual machine (JVM). The remainder of this description of FIG. 2 will therefore refer to the methods identified in stack frames 202, 204, 206, and 208 as "methods 202, 204, 206, and 208."

Each of methods 202, 204, 206, and 208 is associated with a protection domain (protection domains 210, 214, 218, and 222). In a preferred embodiment of the present invention, protection domains 210, 214, 218, and 222 are represented in the JVM by objects from a class descended from the JAVA™ standard "ProtectionDomain" class. Recall from the above discussion of the background of the invention, that the JAVA™ ProtectionDomain class defines a mapping from a CodeSource to a collection of Permissions. Protection domains 210, 214, 218, and 222, however, contain additional mappings into security levels 226 and 228.

Security levels 226 and 228 each define a set of security policies associated with that security level. For example, security level 228, which represents the "trusted" security level, would define a policy in which methods associated with security level 228 are allowed to call any other methods in the runtime environment, regardless of the security levels of the called methods. Security level 226, on the other hand, would define a policy in which methods associated with security level 226 are not allowed to call trusted methods, but are allowed to call methods from other security levels, including other privileged methods.

In order to allow a finer measure of control than a pure security-level scheme provides, protection domains 210, 214, 218, and 222 are also associated with individual instance permissions 212, 216, 220, and 224, respectively. These instance permissions allow exceptions to the default security policies of the security level to be defined with respect to particular code units, or more precisely, particular CodeSources. Thus, method 204, which is associated with privileged security level 226, has individual instance permissions 216, which allow method 204 to call selected methods associated with trusted security level 228. In a preferred embodiment of the present invention, a method such as method 204 may have instance permissions to call interfaces (not to be confused with the JAVA™ object-oriented programming construct of an interface), which allow higher-security-level methods to be called by lower-security-level methods in a secure fashion. Interfaces are described in more detail in FIG. 3 and its accompanying text.

In order to determine whether a particular method can be called and executed from a particular calling method, it is necessary to examine call stack 200 to determine whether each of the methods identified in call stack 200 has sufficient permissions to allow the desired method to be called by the currently-executing method. This exhaustive check of call stack 200 is necessary to prevent code units having a lower security level from being able to access security-protected resources indirectly through higher-security-level methods, so as to circumvent the runtime security system. In the standard JAVA™ 2 security model, this step of call stack checking, which is performed by the checkpermission( ) method of the AccessController class, requires that individual permissions be checked for each method in call stack 200. JAVA™ 2 defines many such individual permission types, including AllPermission, BasicPermission, FilePermission, SocketPermission, UnresolvedPermission, AudioPermission, AWTPermission, NetPermission, PropertyPermission, ReflectPermission, RuntimePermission, SecurityPermission, SerializablePermission, and SQLPermission. Many of these permissions protect against unauthorized performance of input/output (I/O) operations, since I/O operations have the potential to permanently modify the state of a computing system (e.g., by writing to disk) and, hence, are potential security risks. Since each method can have multiple permissions defined for it in a given protection domain, however, this task of runtime permission checking can become computationally burdensome, due to the fact that each permission for each method can call stack 200 must be enumerated individually.

In a preferred embodiment of the present invention, however, enumerating the individual permissions associated with a method can often be avoided, since many of the security policies defined with respect to a method can be determined simply by identifying the security level of that method. For example, if the method that is desired to be called belongs to privileged security level 226, it is immediately clear from FIG. 2 that method 204 has permission to call and execute the desired method, since method 204 belongs to privileged security level 226. In this case, the individual permissions granted to method 204 need not be checked, since method 204 has implicit permission to execute the desired method by virtue of its security level.

If, on the other hand, the requested method belongs to trusted security level 228, it is necessary to examine method 204's individual instance permissions 216 to determine whether method 204 has permission to execute the desired method. This is because the desired method has a higher security level (Trusted) than that of method 204 (privileged). Note, however, that even in this case, the performance of the security check is still improved, since only method 204's exceptions to the default policies defined with respect to privileged security level 226 (i.e., instance permissions 216) need be examined. In other words, there is no need for every individual security permission associated with ProtectionDomain 214 to be stored in ProtectionDomain 214 or examined individually, since many of these permissions are implicitly defined by reference to security level 226, to which method 204 belongs. These features are explained in further detail in FIGS. 4-8 and their accompanying text.

Figure 3:
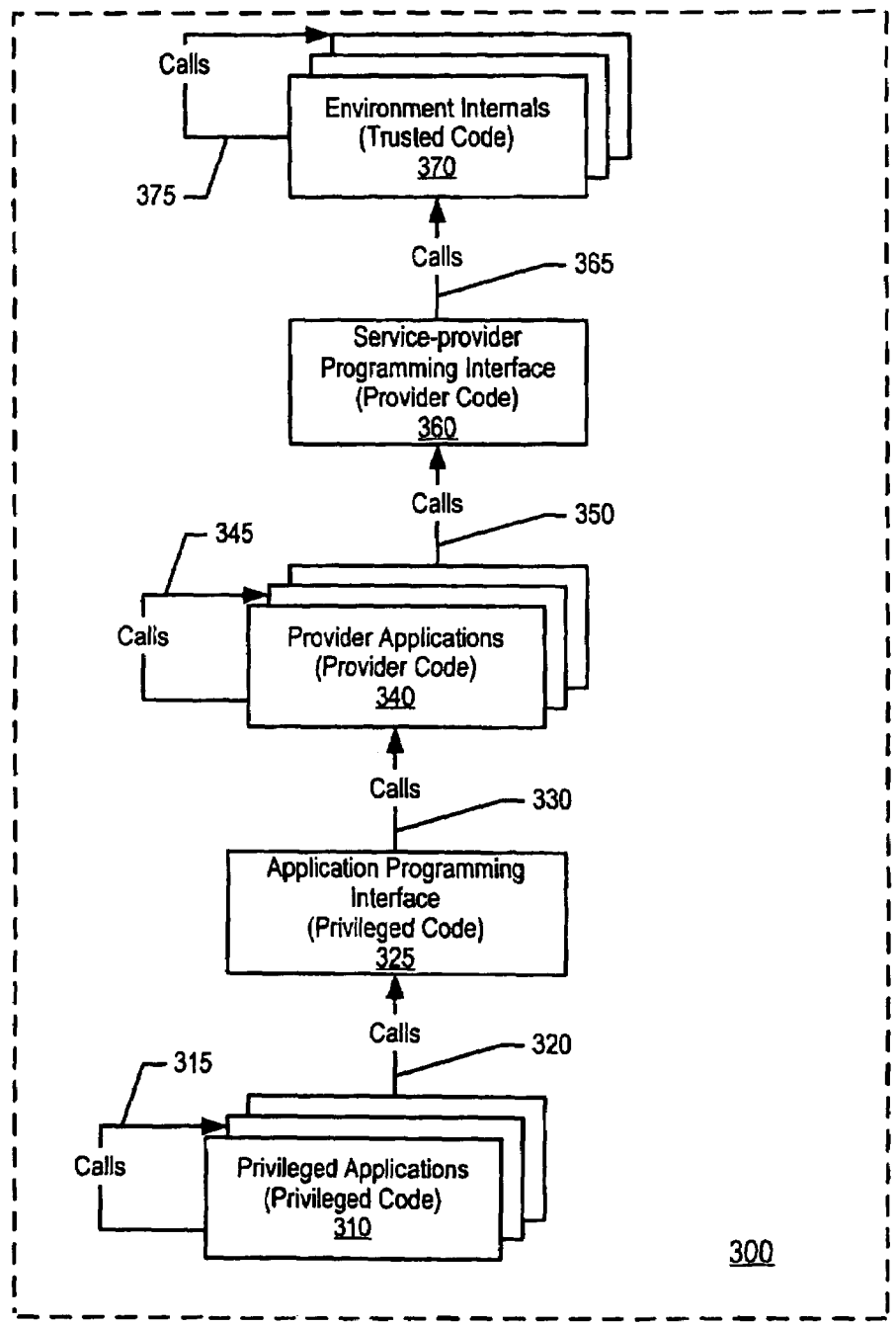
FIG. 3 is a hierarchy diagram showing the interface between code units of differing security levels in a preferred embodiment of the present invention.

FIG. 3 is a hierarchy diagram showing interfaces between code units of differing security levels in accordance with a preferred embodiment of the present invention. Hierarchy 300 includes privileged applications 310, provider applications 340, and platform environment internal code 370. Privileged applications 310 have a "privileged" security level, provider applications 340 have a "provider" security level, and platform environment internal code 370 has a "trusted" security level.

In the example shown in FIG. 3, interfaces are provided between code levels in order to permit lower security level code to access certain methods and data in higher security level code. (It should be noted at this point that the term "interfaces" is being used here in a generic sense to refer to interfacing between different program code components, rather than the specific Java language construct of "interfaces," which are a form of abstract class.) Application Programming Interface (API) 325 has a standard security level but has instance permissions allowing it access to certain provider applications. In this manner, privileged applications 310 can call other privileged applications (code unit calls 315) as well as Application Programming Interfaces (e.g., Application Programming Interface 325) (through code unit calls 320), which provide access to provider applications 340, which would otherwise be off-limits to privileged applications 310. Application Program Interface 325 calls provider applications 340 (code unit calls 330) based upon permissions granted in the individual instance permissions listed in the interface's security policy.

Likewise, provider applications 340 have a security level that allows provider applications 340 to call other provider applications (through code unit calls 345) as well as call Service-provider Programming Interfaces (e.g., Service-provider Programming Interface 360) (through code unit calls 350). In addition, provider applications 340 have authorization to call privileged applications 310 (and also standard applications) that may be listed in the call stack and that are on the provider application's class path (in a JAVA™ runtime environment, a "class path" is a set of directories in which classes that are available at runtime may be found). Service-provider Programming Interface 360 has a provider security level, allowing it to be called by provider applications 340. Service-provider Programming Interface 360 has instance permissions in its security policy allowing it to call certain environment platform internal (trusted) code 370 through code unit calls 365. In addition, Service-provider Programming Interface 360 has authorization to access provider applications 340, any Application Programming Interfaces (e.g., API 325), and any top-level applications 310 that may be listed in the call stack, provided that those code units are in Service-provider Programming Interface 360's class path.

Environment platform internal code 370 is trusted code that constitutes the foundation of the software platform. Internal code units 370 can call other internal code through code unit calls 375. In addition, environment internal code has security authorization to call any other code unit listed in the call stack (i.e., Service-provider Programming Interface 360, provider applications 340, Application Programming Interface 325, and top-level applications 310).

Figure 4:
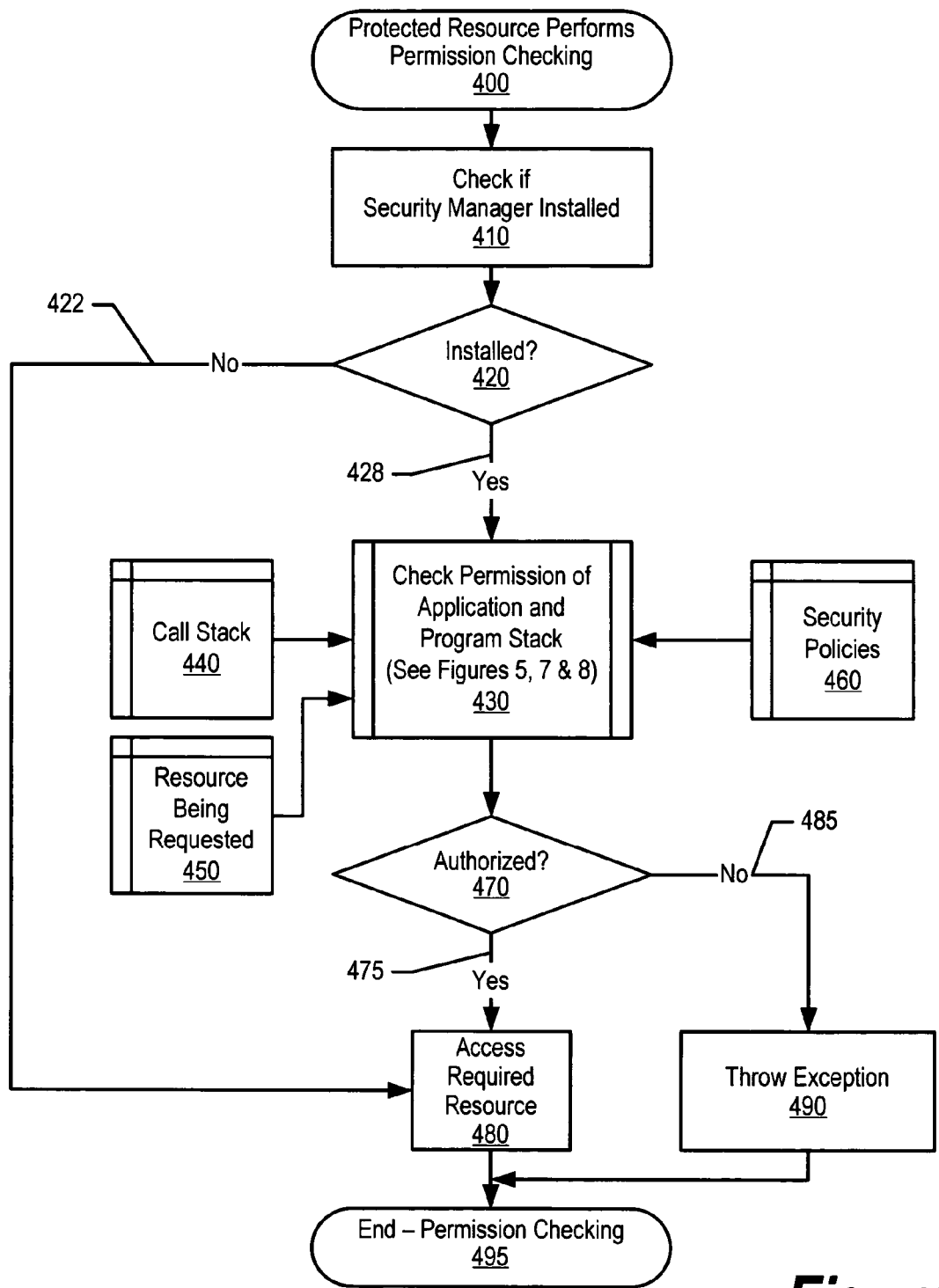
FIG. 4 is a high level flowchart showing the steps taken by the software platform's call handler in a preferred embodiment of the present invention.

FIG. 4 is a high level flowchart showing the steps taken by the software platform's call handler in a preferred embodiment of the present invention. Processing commences at 400 whereupon, at step 410, a check is made to determine whether the software platform's SecurityManager is installed. If the SecurityManager is not installed, decision 420 branches to "no" branch 422, thereby bypassing the security steps. On the other hand, if the SecurityManager is installed, decision 420 branches to "yes" branch 428 whereupon the security permissions (i.e., security levels and/or Permission objects) of the code units in the call stack are checked to make sure that they each have authorization to run the called code unit (predefined process 430, see FIGS. 5, 7 and 8 and corresponding text for processing details).

Predefined process 430 reads data from call stack 440 and the identifier of the code unit being called 450 in order to retrieve security settings 460 (i.e., security policy data) that correspond to the code units listed in the call stack. After the permissions are checked, a determination is made as to whether each code unit in the call stack is authorized to run the called code unit (decision 470). If the code units are authorized, decision 470 branches to "yes" branch 475 whereupon, at step 480, the called code unit is executed. On the other hand, if the code units are not authorized, decision 470 branches to "no" branch 485 whereupon an error is returned to the calling code unit at step 490. Call handler processing thereafter ends at 495.

Figure 5A:
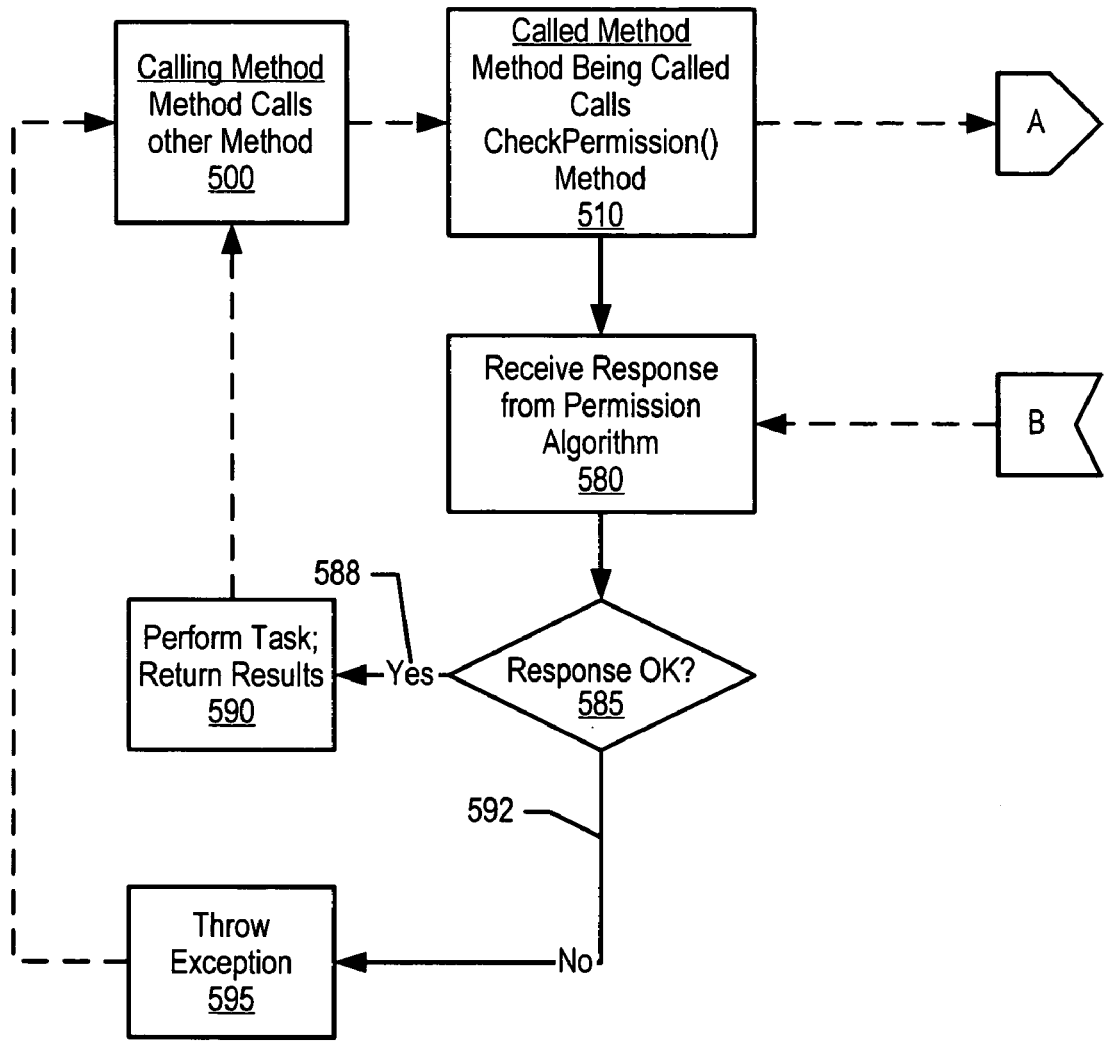
FIGS. 5A-5B are a flowchart showing the steps taken by a called item of code to determine whether to permit the requesting code's request in a preferred embodiment of the present invention.
Figure 5B:
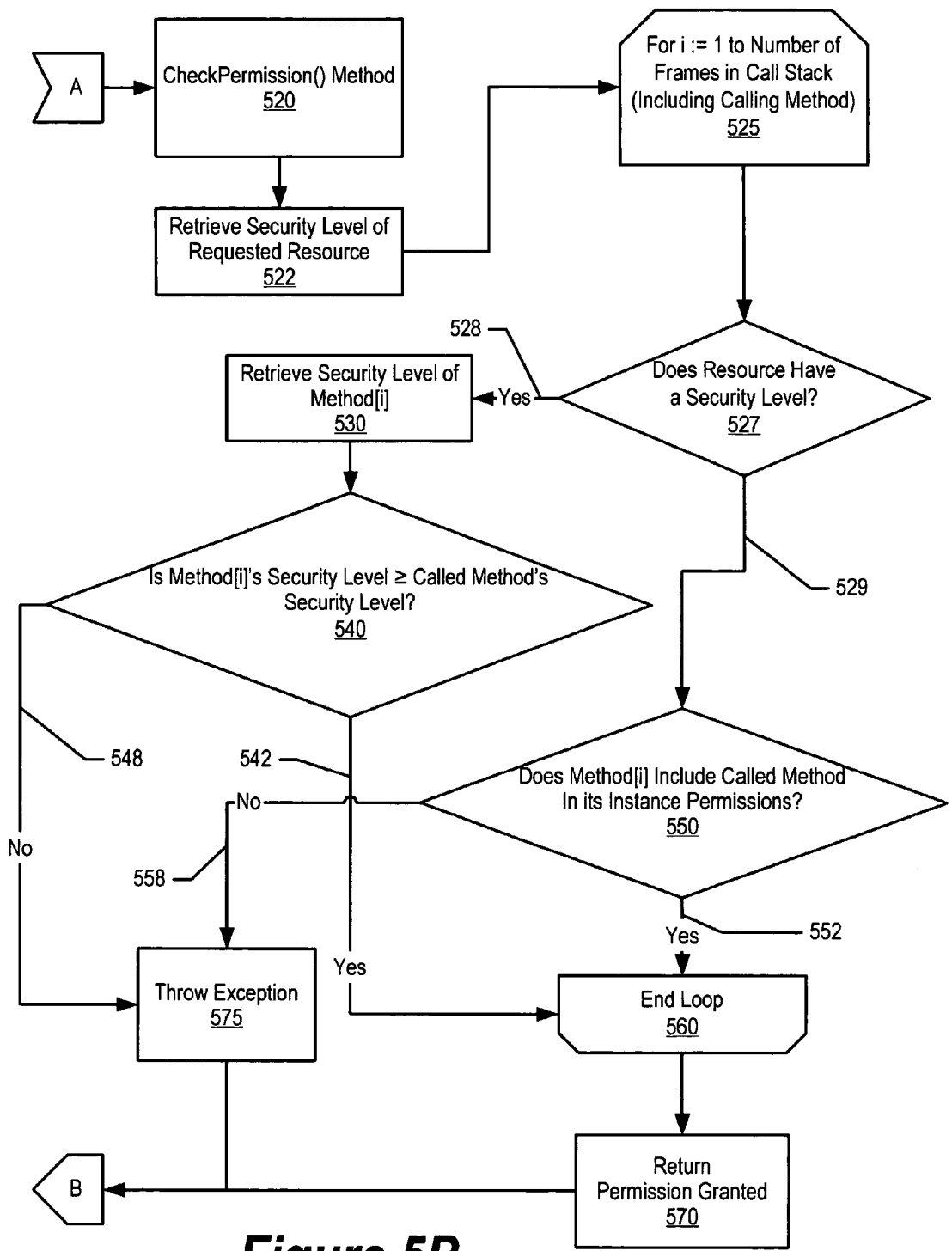

FIGS. 5A and 5B provide a flowchart showing the steps taken by a called code unit to determine whether to permit the requesting code unit's request. A caller code unit (i.e., the code unit that is making a call) makes a method call at step 500. The called code unit (i.e., the code unit whose method is being called by the caller code unit), receives the call at 510, whereupon the called code unit calls the checkpermission( ) method (FIG. 5B). The checkpermission( ) method is called to verify that the caller code unit has a required runtime permission that is needed in order to execute the called method. A "runtime permission" is a permission or authorization to perform a particular task or to access a particular computing resource at runtime.

The checkpermission( ) method commences at 520. The security level needed to execute the called code unit (assuming that the required permission(s) map into a security level) is retrieved at step 522 (i.e., by checking the security policy associated with the called code unit). The security level (privilege level) that is assigned to the called method (process) is known as that called method's "assigned security level." Sometimes the required permission(s) do not map into a security level; this can happen when a required permission was never assigned to a security level or when the required permission is an instance permission, as will be described later.

A loop commences to check each of the code units in the call stack to determine if every code unit has permission to run the called code unit. The loop commences at 525 and is set to process the number of code units in the call stack. During each iteration of the loop, a different code unit from the call stack is selected and analyzed. Inside the loop, if the required permissions mapped into a security level at step 522, execution proceeds to step 530 (branch 528). The security level of the first code unit in the call stack is retrieved (step 530) and this security level is compared with the security level of the code unit that is being called (step 540). If the security level of the code unit in the call stack is high enough (i.e., greater than or equal to) the security level needed to run the called code unit, then processing branches to "yes" branch 542 which falls to the end of the loop (end loop 560) which continues to loop back to the beginning of the loop (start loop 525) until each code unit in the call stack has been processed or until one of the code units in the call stack fails.

Returning to step 540, if the security level of the code unit in the call stack is not high enough (i.e., is less than) the security level needed to run the called code unit, processing branches to "no" branch 548 whereupon, at step 575, an exception is throw, as authorization has failed.

If the required permission was never assigned to a security level or if the required permission is an instance permission, branch 529 is followed at step 527, and execution continues at step 550. If instance permissions allow the code unit in the call stack to call the code unit being called, branch 552 is taken which falls to the end of the loop (end loop 560) which continues to loop back to the beginning of the loop (start loop 525) until each code unit in the call stack has been processed or until one of the code units in the call stack fails. If the loop completes (i.e., each code unit in the call stack is authorized to run the code unit that is being called), then, at step 570, a permission granted message is returned to the code unit that is being called. On the other hand, if neither the code unit's security level nor instance permissions allow the code unit in the call stack to execute the code unit being called, then "no" branch 558 is taken whereupon, at step 575, a permission error is returned to the code unit that is being called.

Returning to the processing performed by the code unit that is being called (510 in FIG. 5A), at step 580, the code unit receives the response from the checkpermission( ) method. A determination is made as to whether the calling code unit (500) has authorization to call the code unit (decision 585). If the response is "OK" (i.e., the caller code unit and code units in the call stack have permission to call the code unit), then "yes" branch 588 is taken whereupon, at step 590, the code unit being called performs the task being requested and returns any results associated with the task to the caller code unit. On the other hand, if the response received from the checkpermission( ) method indicates that either the caller code unit or one of the code units in the call stack does not have permission to call the called code unit, then decision 585 branches to "no" branch 592 whereupon, at step 595, an error is returned to the caller code unit and the requested task is not performed.

Figure 6A:
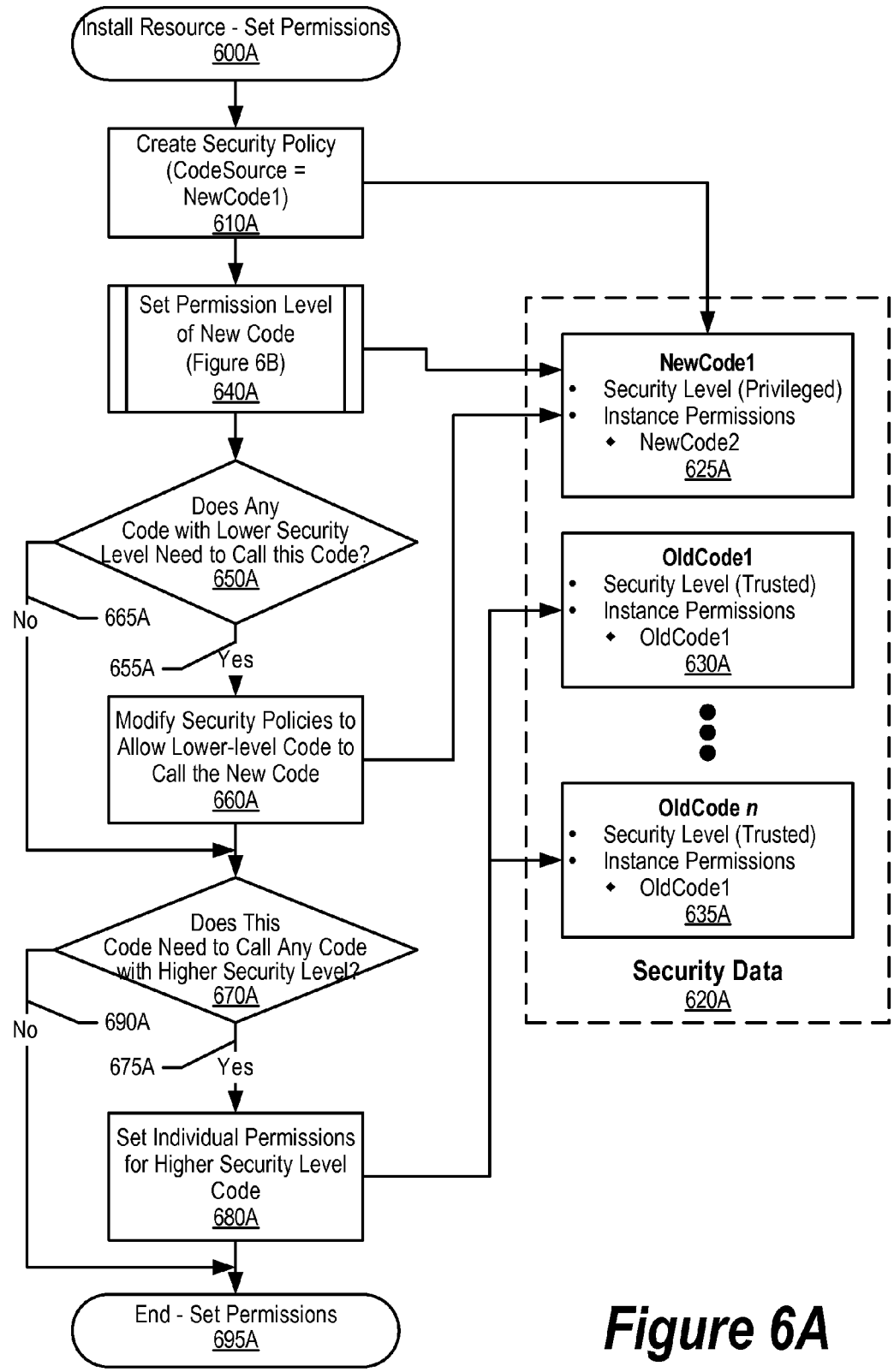
FIG. 6A is a flowchart showing the steps taken to install software and set permission levels in a preferred embodiment of the present invention.

FIG. 6A is a flowchart showing the steps taken to install software and set permission levels in a preferred embodiment of the present invention. Processing commences at 600A whereupon, at step 610A, new security policy 625A is created in security data area 620A. Security data area 620A stores security policies for a variety of code units. These other code units include a code unit that corresponds to security policies 630A and 635A as well as the code unit that corresponds to new security policy 625A.

Figure 6B:
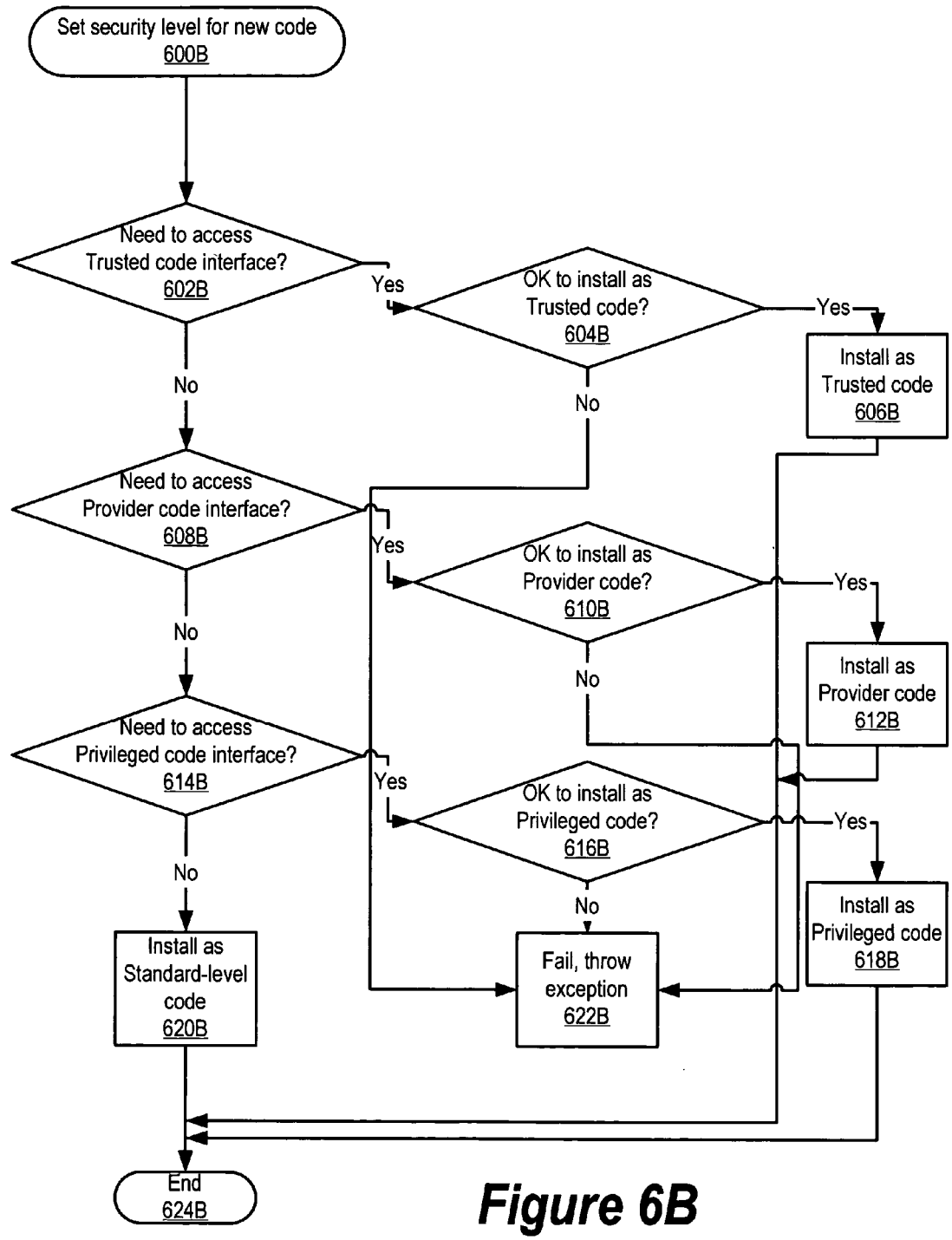
FIG. 6B is a flowchart showing the steps taken to assign a security level to a newly-installed code unit in a preferred embodiment of the present invention.

At step 640A, the security level of the new code unit that is being installed is set and stored in the security policy; this process is described in greater detail in FIG. 6B. A determination is made as to whether any code units with lower security levels need to be able to call the new code unit (decision 650A). If there are code units with lower security levels that need to be able to call the new code unit, then decision 650A branches to "yes" branch 655A whereupon the security policies of existing code units with lower security level are modified to allow the existing code units to call the new code unit. In one embodiment, the required permission(s) are added to the security of the existing code units, while in another embodiment the required permissions are added to the security policy that defines the lower security levels in question, such that the lower-level code units that need to call the new code unit would automatically be granted the permissions required to invoke the new code unit. On the other hand, if there are no code units with lower security levels that need to be able to call the new code unit, then decision 650A branches to "no" branch 665A, thereby bypassing step 660A.

Another determination is made as to whether the new code unit being installed needs to be able to invoke any code units with higher security levels (decision 670A). If the code unit being installed needs to be able to invoke any code units with higher security levels, decision 670A branches to "yes" branch 675A, whereupon at step 680A instance permissions are set allowing the newly installed code unit to execute certain code units with higher security levels. On the other hand, if the code unit being installed does not need to be able to execute any code units with higher security levels, then decision 670A branches to "no" branch 690A bypassing step 680A. Setting permissions for the newly installed code unit thereafter ends at 695A.

FIG. 6B is a flowchart showing the steps taken to set the permission level of a newly-installed code unit in accordance with a preferred embodiment of the present invention. Processing commences at 600B whereupon, at step 602B, a determination is made as to whether the new code unit needs to access trusted-level methods or interfaces. If so, the user/administrator installing the code is prompted as to whether it would be permissible to install the new code unit as trusted-level code (step 604B). If such installation would be permissible, the code unit is then installed as trusted-level code (step 606B). If it would not be permissible, then an exception is thrown to show failure (step 622B).

If the new code unit does not need to access trusted-level methods or interfaces, a determination is made as to whether the new code unit needs to access provider-level methods or interfaces (step 608B). If so, the user/administrator installing the code is prompted as to whether it would be permissible to install the new code unit as provider-level code (step 610B). If such installation would be permissible, the code unit is then installed as provider-level code (step 612B). If it would not be permissible, then an exception is thrown to show failure (step 622B).

If the new code unit does not need to access provider-level methods or interfaces, a determination is made as to whether the new code unit needs to access privileged-level methods or interfaces (step 614B). If so, the user/administrator installing the code is prompted as to whether it would be permissible to install the new code unit as provider-level code (step 616B). If such installation would be permissible, the code unit is then installed as provider-level code (step 618B). If it would not be permissible, then an exception is thrown to show failure (step 622B).

Finally, if the new code unit does not need to access privileged-level methods or interfaces, the code unit is installed as standard-level code (step 620B). Standard level code is not granted any permissions outside those defined by the J2EE specification.

Figure 7:
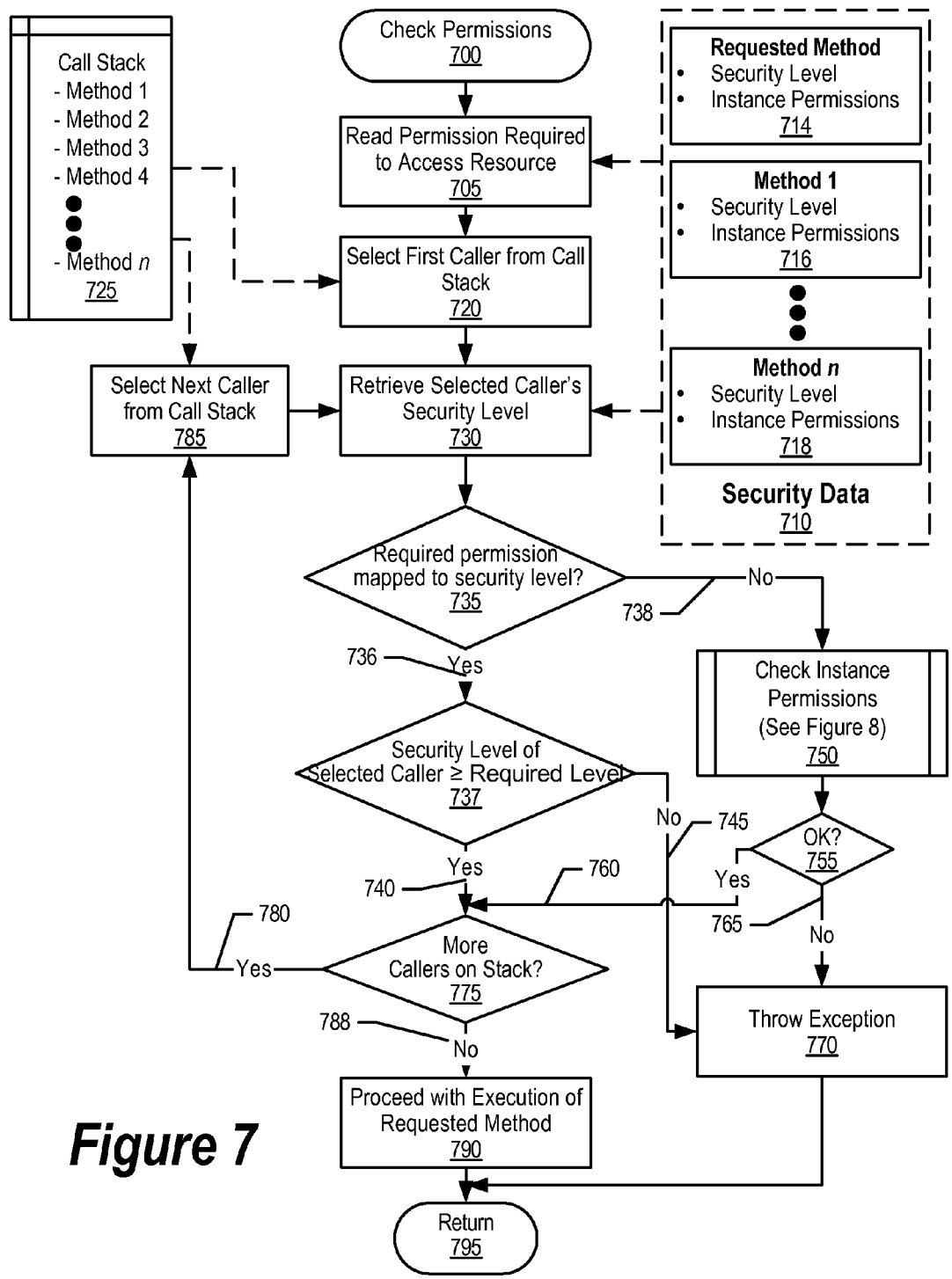
FIG. 7 is a flowchart showing the steps taken to check permissions in a preferred embodiment of the present invention.

FIG. 7 is a flowchart showing the steps taken to check permissions (i.e., the steps taken by the CheckPermissions( ) method) in a preferred embodiment of the present invention. Check permissions processing commences at 700 whereupon, at step 705, the permission needed to run the requested code unit is read from the requested code unit's policy data (policy 714) stored in security data store 710. The required permission may have been mapped to one or more security levels, i.e., the permission may have been added to the security policy defined for one or more security levels.

Each item in call stack 725 is checked to ensure that each code unit has permission to run the requested code unit. The first code unit in the call stack (or last code unit if the stack is being read in a LIFO fashion), is read at step 720. The security level of the selected code unit is read, at step 730, by reading policy data (policy 716 through policy 718) from security data store 710.

A determination is then made as to whether the required permission to execute the requested code unit is mapped to a security level (decision 735). If so, branch 736 is followed, and a determination is made as to whether the selected code unit's security level is high enough to run the requested code unit (decision 737). This determination is made by comparing the security level of the requested code unit (retrieved at step 705) with the security level of the code unit from the call stack (retrieved at step 730). If the security level is high enough, decision 737 branches to "yes" branch 740 whereupon the next code unit in the stack is analyzed. On the other hand, if the selected code unit's security level is not high enough, decision 737 branches to "no" branch 745 whereupon an exception is thrown to signify that authorization has failed (step 770).

Figure 8:
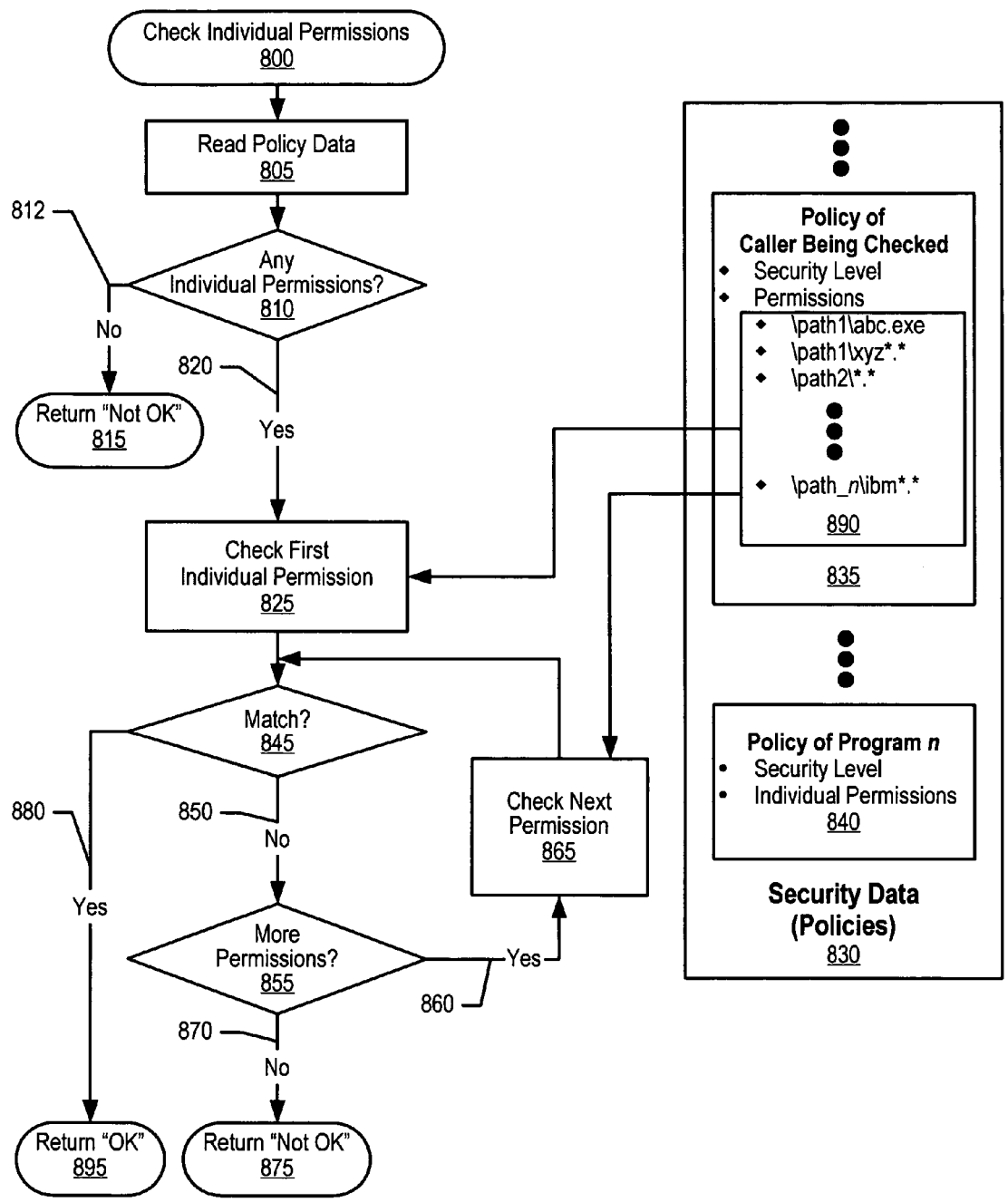
FIG. 8 is a flowchart showing the steps taken to check instance type permissions in a preferred embodiment of the present invention.

If, on the other hand, the required permission does not map to a security level at decision 735, branch 738 is taken, and instance type permissions are checked to determine whether an instance permission exists that gives the selected code unit permission to run the requested code unit (predefined process 750, see FIG. 8 and corresponding text for processing details). A determination is made as to whether the selected code unit has instance type permission (decision 755). If the selected code unit has an instance permission that either is the required permission itself or implies the required permission, decision 750 branches to "yes" branch 760 and processing resumes by checking additional code units on the call stack. On the other hand, if the selected code unit does not have instance type permission, decision 755 branches to "no" branch 765 whereupon, at step 770, an error is returned to the calling code unit indicating that the requesting code unit, or one of the code units in the requesting code unit's call stack does not have authorization to run the requested code unit, and processing returns at 795.

If the selected code unit has a sufficiently high security level (decision 735 branching to "yes" branch 740) or it has an instance permission allowing it to run the requested code unit (decision 755 branching to "yes" branch 760), then a determination is made as to whether there are additional code units on the call stack that need to be checked (decision 775). If there are additional code units that need to be checked, decision 775 branches to "yes" branch 780 whereupon the next code unit is selected from the call stack (step 785) and processing loops back to determine whether the newly selected code unit is authorized to run the requested code unit. This looping continues until either one of the code units in the call stack does not have authorization to run the requested code unit (decision 735 branching to "no" branch 745 and decision 755 branching to "no" branch 765), or until there are no more code units to process on the call stack, whereupon decision 775 branches to "no" branch 788. When all code units on the call stack have authorization to run the requested code unit, an "OK" message is returned to the calling code unit indicating that all of the code units in the call stack have authorization to run the requested code unit (step 790), and processing returns at 795.

FIG. 8 is a flowchart showing the steps taken to check individual instance permissions in a preferred embodiment of the present invention. Processing commences at 800 whereupon instance permissions are read from policy 835 located in security data 830 (step 805). In one embodiment, instance permissions are included in the security policy for the code unit that is being called, while in another embodiment instance permissions are included in the security policy for the code unit in the call stack and indicate which code units with higher security levels the code unit is allowed to run. The two embodiments can be combined in an embodiment that allows a security policy to list other code units that the code unit is allowed to run as well as listing other code units that are allowed to run the code unit. If the two embodiments are combined, then instance permissions included in both policies are read (the policy that corresponds to the requested code unit and the policy that corresponds to the code unit in the call stack).

A determination is made as to whether there are any instance permissions that apply (decision 810). If there are no instance permissions that apply, decision 810 branches to "no" branch 812 whereupon an error is returned at 815 indicating that the code unit from the call stack is not authorized to run the requested code unit through information in the instance permissions. On the other hand, if there are instance permissions that apply, decision 810 branches to "yes" branch 820 whereupon, at step 825, the first instance permission is checked.

A determination is made as to whether there is a match (decision 845). Depending upon the embodiment being used, either an instance in the policy of the code unit that is being requested matches the code unit in the call stack (indicating that the code unit in the call stack is allowed to run the requested code unit), or the policy of the code unit in the code unit matches the code unit being requested. A match can be a specific match, or a wildcard match. Instance permissions 890 shown in policy 835 show various types of instances. As shown in FIG. 8, there may be multiple policies, such as policy 840. The first instance is for a specific code unit in a specific directory ("\path1\abc.exe"). The second instance is for all files (i.e., code units), in the \path1\ directory beginning with the string "xyz" (\path1\xyz*.*). The third instance is for all files in a particular directory "path2" (\path2\*.*). If the selected instance does not match the code unit being checked, decision 845 branches to "no" branch 850 whereupon a determination is made as to whether there are more instance permissions (decision 855). If there are more instance permissions, decision 855 branches to "yes" branch 860 whereupon the next instance permission is checked (step 865) and processing loops back to check the newly selected instance. This looping continues until there is either a match (decision 845 branching to "yes" branch 880 and returning an "OK" return value at 895), or until there are no more instances to check, whereupon decision 855 branches to "no" branch 870 and an error is returned at 875.

Figure 9:
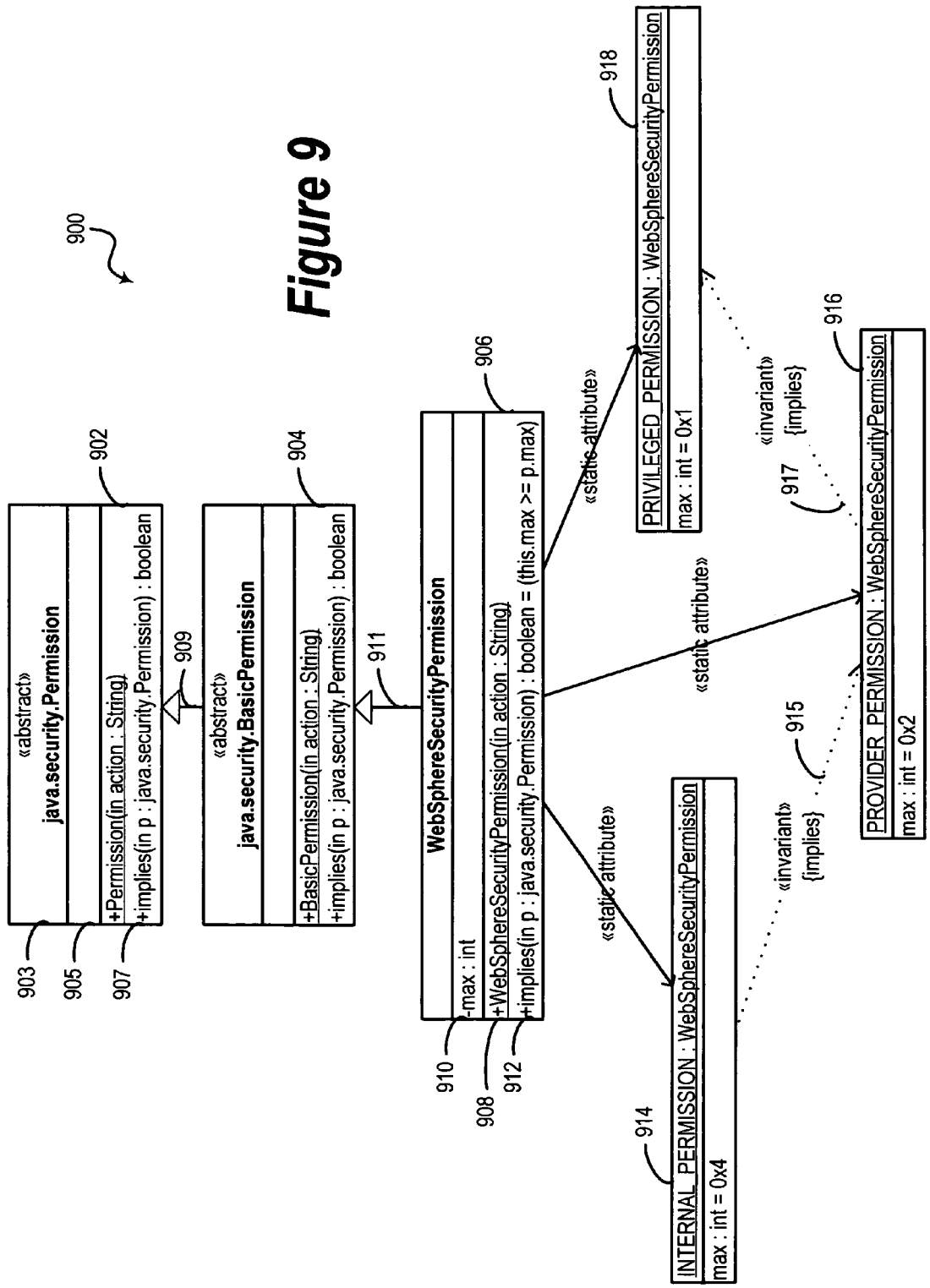
FIG. 9 is a UML class/object diagram describing an object-oriented implementation of a hierarchy of security levels in a preferred embodiment of the present invention.

FIG. 9 is a UML (Uniform Modeling Language) class/object diagram 900 providing additional details concerning the implementation of a preferred embodiment of the present invention in the JAVA™ programming language. It should be noted with particularity that diagram 900 is merely an example of one possible implementation of the present invention, included to clarify the basic concepts underlying the invention by providing them in a concrete form. FIG. 9 should not be interpreted as limiting the invention to a particular software implementation.

UML class diagrams depict classes, such as class 902 in FIG. 9. In an object-oriented programming language, such as the JAVA™ programming language, UML classes may map directly into actual classes implemented in the language, as is the case here in FIG. 9. In a class diagram, a class generally contains three fields, extending from top to bottom. The top field of a class, for example field 903 of class 902, provides the name of the class. The top field may also provide a "stereotype," enclosed in guillemots (<<>>), which provides additional descriptive information about the class (such as whether the class is an "abstract" class, for example). The second field of a class (e.g., field 905 of class 902) provides information about what attributes or variables (if any) are contained within the class. The bottom field of a class (e.g., field 907 of class 902) provides information about the methods (or member functions) defined for the class, their input parameters, and their output(s). Although prior knowledge of UML modeling is not required to understand the following discussion, for general information on UML class/object diagrams, the reader is encouraged to consult FOWLER, Martin, et al. UML Distilled. 2nd edition. Reading, Mass.: Addison-Wesley, 2000. ISBN 020165783X. pp. 49-66, 79-106; and SI ALHIR, Sinan. UML in a Nutshell. Sebastopol, Calif.: O'Reilly and Assocs., 1998. ISBN 1565924487. pp. 139-158.

The preferred embodiment depicted in FIG. 9 is intended to be incorporated into a middleware package (specifically, WebSphere, a product of International Business Machines Corporation). Middleware is typically described as software that sits between two or more types of software, such as an application and an operating system or an application and a database management system, and translates (or "brokers") information between them. Middleware is a broad term that encompasses many different particular genres of software, but the task of most middleware packages is to provide an interface to a particular piece of lower-level software that is simpler, more convenient, or at a higher level of abstraction than the lower-level software provides by itself. The software capabilities provided by such an interface may be described as "middleware services" (i.e., the services provided by a particular middleware package). A "middleware application" is a software application that make use of middleware services.

Turning now to the specifics of diagram 900, class 902 represents the JAVA™ class "java.security.Permission," which is the base class for individual permissions in the JAVA™ 2 security model. Class 904 represents the java class "java.security.BasicPermission," which is a descendent class of "java.security.Permission" in the JAVA™ 2 security object model, as represented by generalization symbol 909. Class 904 is provided by the JAVA™ 2 security object model as a convenient base class for implementing new (i.e., non-standard) permissions. Both class 902 and class 904 are what is known as abstract classes, which means that neither class 902 nor class 904 may be instantiated into an object, but that classes 902 and 904 are used only for the purpose of defining descendant classes, such as class 906 (q.v.) in FIG. 9. At this point it should also be noted that the lists of attributes and methods of classes 902 and 904 in FIG. 9 are greatly abbreviated for conceptual simplicity and are not intended to describe the full extent of attributes and methods defined with respect to these classes.

Class 906, the "WebSphereSecurityPermission" class, is specific to a preferred embodiment of the present invention and is implemented as a descendent class of class 904, as represented by generalization symbol 911. Like classes 902 and 904, class 906 defines methods that include a constructor method 908 (which in JAVA™ takes the same name as the class) and an "implies( )" method 912. "implieso" method 912 takes an object of class "java.security.Permission" as an argument and returns a Boolean value. Semantically, implies( ) method 912 denotes whether a particular instance of class 906 (that is, a particular "WebSphereSecurityPermission") implies another permission (of class "java.security.Permission" or one of its descendants).

In a preferred embodiment of the present invention, implies method 912 is used to create a hierarchy of security levels, wherein each security level represents a set of permissions, and each higher security level's set of permissions is a superset of every lower level's set of permissions. Thus, if "A" is a WebSphereSecurityPermission object representing one security level and "B" is a WebSphereSecurityPermission object representing a lower security level, then executing the JAVA™ statement "A.implies(B)" would return a value of "true," while "B.implies(A)" would return a value of "false."

Instantiating a WebSphereSecurityPermission is done by calling constructor method 908 with a String argument that denotes a particular security level. In this preferred embodiment, the security levels are denoted by the strings "internal," "provider," and "privileged," which correspond to the "trusted," "provider," and "privileged" security levels of FIGS. 1A and 1B, respectively. In this preferred embodiment, the "standard" level is denoted by a lack of a "WebSphereSecurityPermission" object for a particular "standard" code unit.

Each WebSphereSecurityPermission represents a specific security level. Because the "internal" WebSphereSecurityPermission implies the "provider" WebSphereSecurityPermission and the "provider" WebSphereSecurityPermission implies the "privileged" WebSphereSecurityPermission, these three security levels form a well-ordered set under the "implies" relation. It is thus possible to encode the security levels as distinct integer values such that a higher security level is represented by a higher integer. In fact, this is what is done in a preferred embodiment of the present invention. Constructor 908 takes a String value as an argument and stores a corresponding integer value in "max" attribute 910 of the instantiated WebSphereSecurityPermission object. In the preferred embodiment depicted in FIG. 9, three objects (914, 916, and 918) of class 906 are actually instantiated as static (class-scope) attributes of class 906 itself.: INTERNAL_PERMISSION object 914, representing the highest security level, has a "max" value of 4, PROVIDER_PERMISSION object 916 has a "max" value of 2, and PRIVILEGED_PERMISSION object 918, representing the lowest of the three levels, has a "max" value of 1.

This internal integer representation of the security level associated with a given WebSphereSecurityPermission object can be exploited to make implies( ) method 912 highly efficient. In this preferred embodiment, when implies( ) method 912 is used to see if one WebSphereSecurityPermission object (corresponding to one security level) is the same as or higher than a required security level (represented by another WebSphereSecurityPermission object), implies( ) method 912 simply compares the "max" values of the two objects to see if the first one is greater than or equal to the second one. Thus, given pre-instantiated objects 914, 916, and 918, if one were to execute the statement "WebSphereSecurityPermission.INTERNAL_PERMISSION. implies(We bSphereSecurityPermission.PROVIDER_PERMISSION)" the result would be "true," since the "max" value of INTERNAL_PERMISSION object 914 (i.e., 4) is greater than or equal to the "max" value of PROVIDER_PERMISSION 916 (i.e., 2). In the case that implies( ) method 912 is invoked with a Permission object that is not a member of WebSphereSecurityPermission class 906 (so that it does not have a "max" value), an exception is thrown, since WebSphereSecurityPermission objects are considered to be comparable only with other WebSphereSecurityPermission objects in the object model of this preferred embodiment.

Thus, semantically, implies( ) method 912 is an implementation of relationships 915 and 917 in FIG. 9, wherein INTERNAL_PERMISSION object 914 implies PROVIDER_PERMISSION object 916, which in turn implies PRIVILEGED_PERMISSION object 918. Since each of permission objects 912, 914, and 916 represents a particular security level's set of individual permissions, "implies" relationships 915 and 917 have the effect of creating a subset-superset relationship between the sets of permissions represented by each security level. Were it not for the particular integer representation, utilized, it would be necessary to employ some form of container object (such as an object of class "java.security.PermissionCollection") in order to define these subset-superset relationships, which would represent a significant performance degradation over this preferred embodiment.

Figure 10:
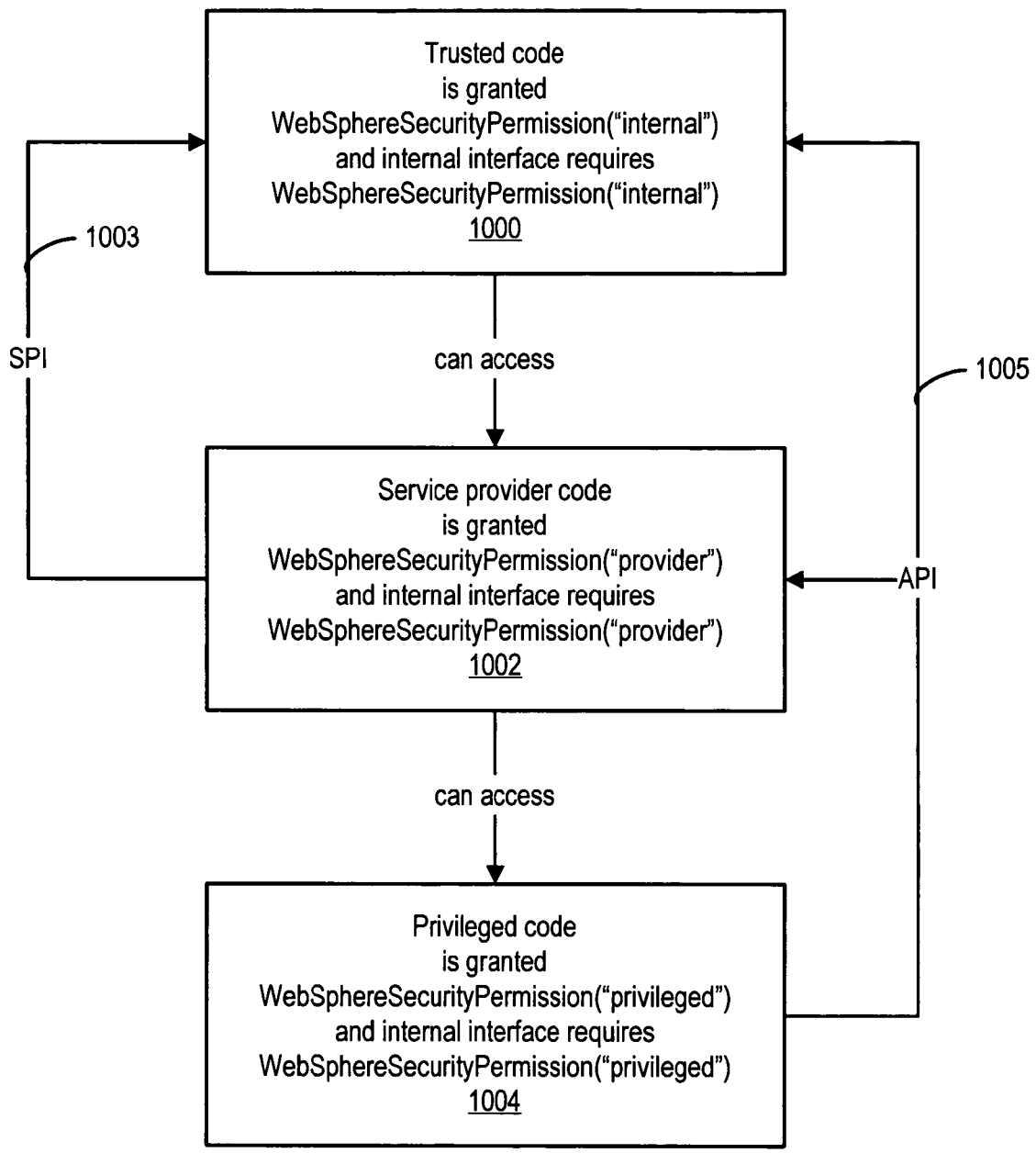
FIG. 10 is a diagram depicting relationships between code units having various permission objects corresponding to different security levels in a preferred embodiment of the present invention.

The semantic relationships established by the object model depicted in FIG. 9 can be better understood with respect to FIG. 10, which is a diagram that illustrates semantic relationships between different WebSphereSecurityPermission objects in accordance with a preferred embodiment of the present invention. Trusted code units 1000, which demand the highest level of security, are granted a Permission object that is an instantiation of the WebSphereSecurityPermission class (class 906 in FIG. 9) with a String argument of "internal" provided to the constructor (constructor 908 in FIG. 9). Methods that need to invoke particular trusted-code-level methods (i.e., that need to access the "internal interface" of a trusted code unit) must come from code units that have been granted a WebSphereSecurityPermission("internal") Permission object (i.e., an object of the WebSphereSecurityPermission class, where a String argument of "internal" is passed to the constructor) or have instance permissions that allow access to particular trusted code units or methods.

Service provider code units 1002, which demand the next highest level of security, are granted a WebSphereSecurityPermission("provider") object. Methods that need to invoke particular provider-code-level methods (i.e., that need to access the "internal interface" of a service provider code unit) must come from code units that have been granted a WebSphereSecurityPermission("provider") Permission object or have instance permissions that allow access to particular provider code units or methods.

A Service-provider Programming Interface (SPI) 1003 is provided, which comprises one or more code units having "provider" security level (having been granted a WebSphereSecurityPermission("provider") Permission object), but which also have instance permissions to access particular trusted code units or methods. SPI 1003 is used by service provider code units 1002 to obtain limited access to necessary resources that are normally only accessible through trusted code units 1000. For example, SPI 1003 may be utilized to allow a service provider code to access a particular single entry in a password file (by way of an instance permission), when access to that password file is normally only allowed to trusted-level code.

Privileged code units 1004 are granted a WebSphereSecurityPermission("privileged") object. Methods that need to invoke particular privileged-code-level methods (i.e., that need to access the "internal interface" of a privileged provider code unit) must come from code units that have been granted a WebSphereSecurityPermission("privileged") Permission object or have instance permissions that allow access to particular privileged code units or methods.

In a similar fashion to SPI 1003, an Application Programming Interface (API) 1005 is provided, which comprises one or more code units having "privileged" security level (having been granted a WebSphereSecurityPermission("privileged") Permission object), but which also have instance permissions to access particular trusted or service provider code units or methods. API 1005, like SPI 1003, is used by privileged code units 1004 to obtain limited access to necessary resources that are normally only accessible through either trusted code units 1000 or service provider code units 1002.

Figure 11:
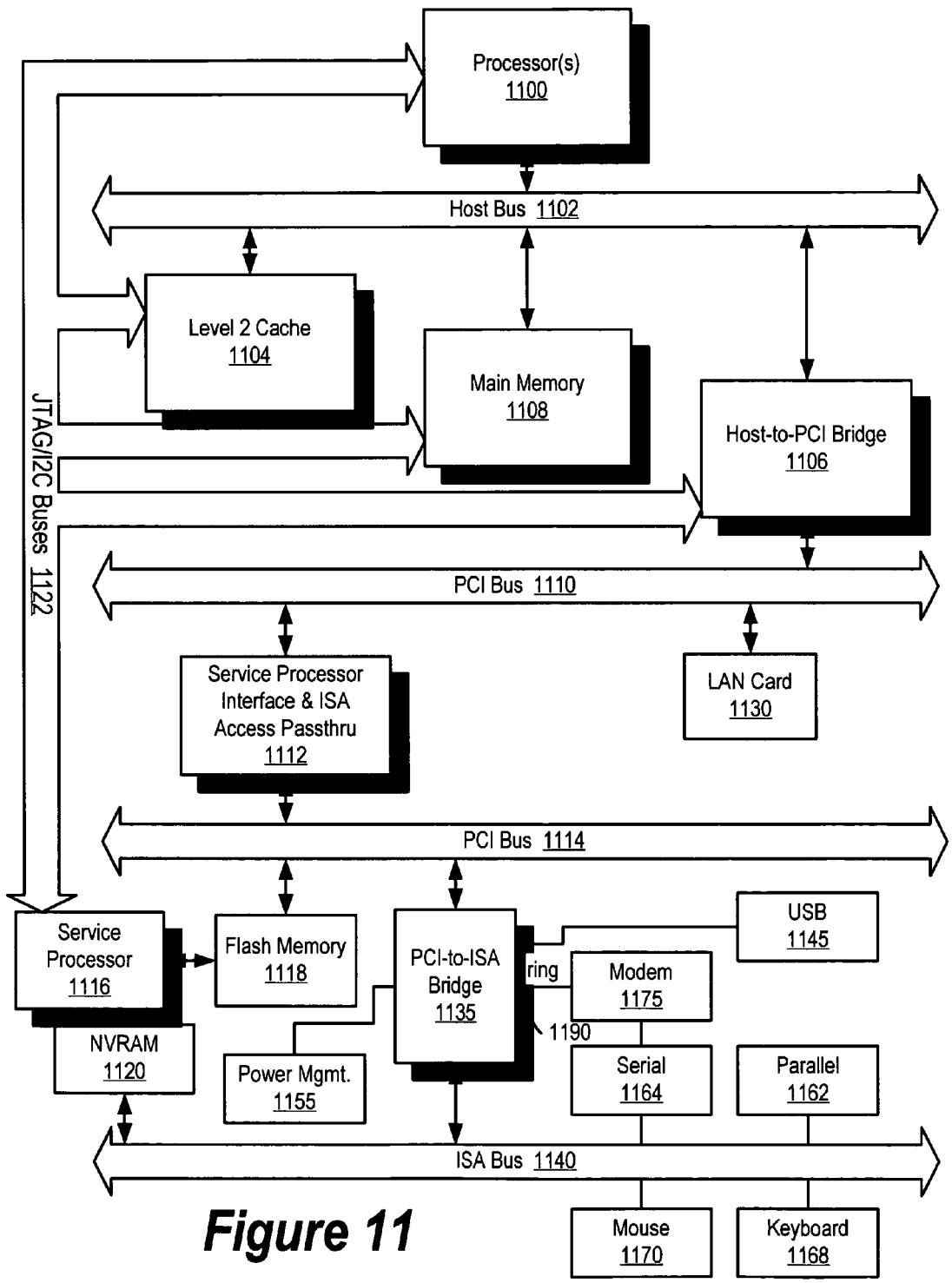
FIG. 11 is a block diagram of a computing device capable of supporting a preferred embodiment of the present invention.

FIG. 11 illustrates an information handling system which is a simplified example of a computer system capable of performing the computing operations described herein with respect to a preferred embodiment of the present invention. The information handling system shown in FIG. 11 includes processor 1100 which is coupled to host bus 1102. A level two (L2) cache memory 1104 is also coupled to host bus 1102. Host-to-PCI bridge 1106 is coupled to main memory 1108, includes cache memory and main memory control functions, and provides bus control to handle transfers among PCI bus 1110, processor 1100, L2 cache 1104, main memory 1108, and host bus 1102. Main memory 1108 is coupled to Host-to-PCI bridge 1106 as well as host bus 1102. Devices used solely by host processor(s) 1100, such as LAN card 1130, are coupled to PCI bus 1110. Service Processor Interface and ISA Access Pass-through 1112 provides an interface between PCI bus 1110 and PCI bus 1114. In this manner, PCI bus 1114 is insulated from PCI bus 1110. Devices, such as flash memory 1118, are coupled to PCI bus 1114. In one implementation, flash memory 1118 includes BIOS code that incorporates the necessary processor executable code for a variety of low-level system functions and system boot functions.

PCI bus 1114 provides an interface for a variety of devices that are shared by host processor(s) 1100 and Service Processor 1116 including, for example, flash memory 1118. PCI-to-ISA bridge 1135 provides bus control to handle transfers between PCI bus 1114 and ISA bus 1140, universal serial bus (USB) functionality 1145, power management functionality 1155, and can include other functional elements not shown, such as a real-time clock (RTC), DMA control, interrupt support, and system management bus support. Nonvolatile RAM 1120 is attached to ISA Bus 1140. Service Processor 1116 includes JTAG and I2C buses 1122 for communication with processor(s) 1100 during initialization steps. JTAG/I2C buses 1122 are also coupled to L2 cache 1104, Host-to-PCI bridge 1106, and main memory 1108 providing a communications path between the processor, the Service Processor, the L2 cache, the Host-to-PCI bridge, and the main memory. Service Processor 1116 also has access to system power resources for powering down the information handling system.

Peripheral devices and input/output (I/O) devices can be attached to various interfaces (e.g., parallel interface 1162, serial interface 1164, keyboard interface 1168, and mouse interface 1170 coupled to ISA bus 1140. Alternatively, many I/O devices can be accommodated by a super I/O controller (not shown) attached to ISA bus 1140.

In order to attach the information handling system to another computer system to copy files over a network, LAN card 1130 is coupled to PCI bus 1110. Similarly, to connect the information handling system to an ISP to connect to the Internet using a telephone line connection, modem 1175 is connected to serial port 1164 and PCI-to-ISA Bridge 1135.

While the computer system described in FIG. 11 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the functional descriptive material may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented process comprising:
   determining a first security level of a caller code unit identified in a call stack;
   determining if a required permission maps to a second security level, wherein the required permission is associated with a desired code unit to be executed;
   in response to a determination that the required permission maps to the second security level, performing the following:
      determining if the second security level is higher than the first security level;
      in response to determined that the second security level is not higher than the first security level, executing the desired code unit;
      in response to determined that the second security level is higher than the first security level, performing the following:
         examining each of a plurality of individual permissions, the plurality of individual permissions associated with the caller code unit, to determine whether one of the individual permissions permits the caller code unit to execute the desired code unit; and
         executing the desired code unit in response to a determination that one of the individual permissions permits the caller code unit to execute the desired code unit; and
   in response to a determination that the required permission does not map to the second security level, performing the following:
      examining each of the plurality of individual permissions associated with the caller code unit, to determine whether one of the individual permissions permits the caller code unit to execute the desired code unit; and
      executing the desired code unit in response to a determination that one of the individual permissions permits the caller code unit to execute the desired code unit.

2. The process of claim 1, wherein the caller code unit is one of a method, a function, a procedure, a subroutine, an object, a constructor, a destructor, a clause, and an operator.

3. The process of claim 1, wherein the process is embodied in a permission-checking code unit that is invoked by the desired code unit as a prerequisite to further execution of the desired code unit.

4. The process of claim 3, wherein the permission-checking code unit forms a method in a class derived from a security-enforcement class in an object-oriented programming language.

5. The process of claim 1, wherein the second security level is a minimum security level required to execute the desired code unit.

6. An information handling system comprising:
   one or more processors;
   one or more data storage units accessible by the processors; and
   functional descriptive material contained within the data storage units that, when executed by the processors, directs the processors to perform actions of:
   determining a first security level of a caller code unit identified in a call stack;
   determining if a required permission maps to a second security level, wherein the required permission is associated with a desired code unit to be executed;

in response to a determination that the required permission maps to a second security level, performing the following:

determining if the second security level is higher than the first security level;

in response to determining that the second security level is not higher than the first security level, executing the desired code unit;

in response to determining that the second security level is higher than the first security level, performing the following:

examining each of a plurality of individual permissions, the plurality of individual permissions associated with the caller code unit, to determine whether one of the individual permissions permits the caller code unit to execute the desired code unit; and executing the desired code unit in response to a determination that one of the individual permissions permits the caller code unit to execute the desired code unit; and in response to a determination that the required permission does not map to the second security level, performing the following:

examining each of the plurality of individual permissions associated with the caller code unit, to determine whether one of the individual permissions permits the caller code unit to execute the desired code unit; and executing the desired code unit in response to a determination that one of the individual permissions permits the caller code unit to execute the desired code unit.

7. The information handling system of claim 6, wherein the caller code unit is one of a method, a function, a procedure, a subroutine, an object, a constructor, a destructor, a clause, and an operator.

8. The information handling system of claim 6, wherein the actions are defined within the functional descriptive material in the form of a permission-checking code unit that is invoked by the desired code unit as a prerequisite to further execution of the desired code unit.

9. The information handling system of claim 8, wherein the permission-checking code unit forms a method in a class derived from a security-enforcement class in an object-oriented programming language.

10. A computer program product stored in a computer memory, comprising functional descriptive material that, when executed by an information handling system, causes the information handling system to perform actions for enforcing security policies with respect to units of executable code, said actions comprising:

determining a first security level of a caller code unit identified in a call stack;

determining if a required permission maps to a second security level, wherein the required permission is associated with a desired code unit to be executed;

in response to a determination that the required permission maps to a second security level, performing the following:

determining if the second security level is higher than the first security level;

in response to determining that the second security level is not higher than the first security level, executing the desired code unit;

in response to determining that the second security level is higher than the first security level, performing the following:

examining each of a plurality of individual permissions, the plurality of individual permissions associated with the caller code unit, to determine whether one of the individual permissions permits the caller code unit to execute the desired code unit; and executing the desired code unit in response to a determination that one of the individual permissions permits the caller code unit to execute the desired code unit; and in response to a determination that the required permission does not map to the second security level, performing the following:

examining each of the plurality of individual permissions associated with the caller code unit to determine whether one of the individual permissions permits the caller code unit to execute the desired code unit; and executing the desired code unit in response to a determination that one of the individual permissions permits the caller code unit to execute the desired code unit.

11. The computer program product of claim 10, wherein the caller code unit is one of a method, a function, a procedure, a subroutine, an object, a constructor, a destructor, a clause, and an operator.

12. The computer program product of claim 10, wherein the actions are defined within the functional descriptive material in a permission-checking code unit that is invoked by the desired code unit as a prerequisite to further execution of the desired code unit.

\* \* \* \* \*